(12) United States Patent
Francis

(10) Patent No.: US 11,193,847 B1
(45) Date of Patent: Dec. 7, 2021

(54) PIPELINE BREACH LOCATION DETECTION SYSTEMS AND METHODS

(71) Applicant: Trinity Bay Equipment Holdings, LLC, Houston, TX (US)

(72) Inventor: Kirk Spencer Francis, Richmond, TX (US)

(73) Assignee: Trinity Bay Equipment Holdings, LLC, Houston, TX (US)

(*) Notice: Subject to any disclaimer, the term of this patent is extended or adjusted under 35 U.S.C. 154(b) by 0 days.

(21) Appl. No.: 17/180,951

(22) Filed: Feb. 22, 2021

(51) Int. Cl.
*G01M 3/22* (2006.01)
*G01M 3/24* (2006.01)
*G01M 3/04* (2006.01)
*G01M 3/00* (2006.01)

(52) U.S. Cl.
CPC .............. *G01M 3/04* (2013.01); *G01M 3/002* (2013.01); *G01M 3/22* (2013.01); *G01M 3/243* (2013.01)

(58) Field of Classification Search
CPC .......... G01M 3/04; G01M 3/243; G01M 3/20; G01M 3/22
See application file for complete search history.

(56) References Cited

U.S. PATENT DOCUMENTS

| 3,191,427 | A | * | 6/1965 | Rapson, Jr. | ............ | G01M 3/221 73/40.5 R |
| 4,450,711 | A | * | 5/1984 | Claude | ...................... | F16L 9/18 340/605 |
| 4,524,609 | A | * | 6/1985 | Sharp | ................... | B65D 90/507 73/49.2 |
| 5,375,457 | A | * | 12/1994 | Trapp | ..................... | G01M 3/202 73/40 |
| 2020/0200302 | A1 | * | 6/2020 | Di Carlo | .................. | F16L 9/06 |

* cited by examiner

*Primary Examiner* — Nathaniel J Kolb
(74) *Attorney, Agent, or Firm* — Conrad J. Hsu

(57) ABSTRACT

Techniques for implementing and/or operating a system that includes an inner pipe segment disposed within an outer bore and a testing apparatus. The inner pipe segment includes tubing that defines a pipe bore through the inner pipe segment and a fluid conduit within a tubing annulus of the inner pipe segment. The testing apparatus includes a test fluid source fluidly connected to the fluid conduit defined within the inner pipe segment, in which the test fluid source injects test fluid into the tubing annulus of the inner pipe segment, and sensors disposed along the outer bore, in which the sensors determine sensor data indicative of a downstream parameter that results due to injection of the test fluid into the tubing annulus of the inner pipe segment to enable a potential location of a breach in the tubing of the inner pipe segment to be determined based on the downstream parameter.

20 Claims, 7 Drawing Sheets

76 →

78 →
┌─────────────────────────────────────────────────────────┐
│         Dispose sensors along pipeline system           │
│ 88 →                                                    │
│ ┌─────────────────────────────────────────────────────┐ │
│ │ Secure sensors along pipe bore of inner pipe segment│ │
│ └─────────────────────────────────────────────────────┘ │
│ 90 →                                                    │
│ ┌─────────────────────────────────────────────────────┐ │
│ │         Secure sensors along outer bore             │ │
│ └─────────────────────────────────────────────────────┘ │
│ 92 →                                                    │
│ ┌─────────────────────────────────────────────────────┐ │
│ │       Dispose sensor within sensor opening          │ │
│ └─────────────────────────────────────────────────────┘ │
└─────────────────────────────────────────────────────────┘
                              ↓
84 →
┌ ─ ─ ─ ─ ─ ─ ─ ─ ─ ─ ─ ─ ─ ─ ─ ─ ─ ─ ─ ─ ─ ─ ─ ─ ─ ─ ─ ┐
         Seal unused sensor opening
└ ─ ─ ─ ─ ─ ─ ─ ─ ─ ─ ─ ─ ─ ─ ─ ─ ─ ─ ─ ─ ─ ─ ─ ─ ─ ─ ─ ┘
                              ↓
80 →
┌─────────────────────────────────────────────────────────┐
│   Communicatively couple sensors to control sub-system  │
└─────────────────────────────────────────────────────────┘
                              ↓
82 →
┌─────────────────────────────────────────────────────────┐
│  Fluidly connect test fluid source to tubing annulus of inner │
│                     pipe segment                        │
└─────────────────────────────────────────────────────────┘
                              ↓
86 →
┌ ─ ─ ─ ─ ─ ─ ─ ─ ─ ─ ─ ─ ─ ─ ─ ─ ─ ─ ─ ─ ─ ─ ─ ─ ─ ─ ─ ┐
    Communicatively couple test fluid source to control
                      sub-system
└ ─ ─ ─ ─ ─ ─ ─ ─ ─ ─ ─ ─ ─ ─ ─ ─ ─ ─ ─ ─ ─ ─ ─ ─ ─ ─ ─ ┘

FIG. 6

PIPELINE BREACH LOCATION DETECTION SYSTEMS AND METHODS

BACKGROUND

The present disclosure generally relates to pipeline systems and, more particularly, to a testing apparatus that may be deployed in a pipeline system to facilitate detecting the potential location of a breach (e.g., leak or inadvertent opening) in the pipeline system.

Pipeline systems are often used to transport (e.g., convey) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, potable water, fresh water, fracturing fluid, flowback fluid, carbon dioxide, or any combination thereof.

To facilitate transporting fluid, a pipeline system may include one or more pipe segments in addition to pipe (e.g., midline and/or end) fittings, which are used to connect a pipe segment to another pipeline component, such as another pipe fitting, another pipe segment, a fluid source, and/or a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid (e.g., clean and/or potable water).

In any case, at least in some instances, the tubing of a pipe segment deployed in a pipeline system may become damaged such that its structural integrity is compromised. For example, a breach (e.g., hole or inadvertent opening) in the pipe segment tubing may result in excessive (e.g., undesired) fluid flow from the pipe segment directly out into environmental conditions external to the pipe segment and/or from the external environmental conditions directly into the pipe segment. In other words, at least in some instances, operating a pipeline system while a pipe segment deployed therein has a breach may affect (e.g., reduce) operational efficiency and/or operational reliability of the pipeline system, for example, due to the breach resulting in conveyed fluid being lost to and/or contaminated by external environmental conditions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a system includes an inner pipe segment disposed within an outer bore and a testing apparatus. The inner pipe segment includes tubing that defines a pipe bore through the inner pipe segment and a fluid conduit within a tubing annulus of the inner pipe segment. The testing apparatus includes a test fluid source fluidly connected to the fluid conduit defined within the tubing annulus of the inner pipe segment, in which the test fluid source injects test fluid into the tubing annulus of the inner pipe segment, and sensors disposed along the outer bore, in which the sensors determine sensor data indicative of one or more downstream parameters that result due to injection of the test fluid into the tubing annulus of the inner pipe segment to enable a potential location of a breach in the tubing of the inner pipe segment to be determined based at least in part on the one or more downstream parameters that result due to injection of the test fluid into the tubing annulus of the inner pipe segment.

In another embodiment, a method of operating a testing apparatus deployed in a pipeline system includes instructing, using a control sub-system of the testing apparatus, a test fluid source of the testing apparatus to inject test fluid into free space defined within a tubing annulus of an inner pipe segment in the pipeline system that is disposed within an outer bore, determining, using the control sub-system, one or more downstream parameters that result due to injection of the test fluid into the tubing annulus of the inner pipe segment based at least in part on sensor data determined by sensors of the testing apparatus that are disposed along the pipeline system, determining, using the control sub-system, whether a breach is potentially present in the inner pipe segment based at least in part on the one or more downstream parameters that result due to injection of the test fluid into the tubing annulus of the inner pipe segment, and, in response to determining that a breach is potentially present in the inner pipe segment, determining, using the control sub-system, a potential location of the breach based at least in part on the one or more downstream parameters that result due to injection of the test fluid into the tubing annulus of the inner pipe segment.

In another embodiment, a testing apparatus to be deployed in a pipeline system includes a test fluid source to be fluidly connected to free space defined within a tubing annulus of a pipe segment in the pipeline system to enable the test fluid source to inject test fluid into the tubing annulus of the pipe segment, sensors to be disposed along a bore in the pipeline system to enable the sensors to determine sensor data indicative of one or more downstream parameters that result due to the test fluid being injected into the tubing annulus of the pipe segment, and a control sub-system communicatively coupled to the sensors to enable the control sub-system to determine one or more downstream parameter trends that result due to the test fluid being injected into the tubing annulus of the pipe segment based at least in the sensor data determined by the sensors and determine a potential location of a breach in the pipe segment based at least in part on a maximum in the one or more downstream parameter trends.

BRIEF DESCRIPTION OF DRAWINGS

FIG. 6 is a flow diagram of an example of a process for implementing a testing apparatus, in accordance with an embodiment of the present disclosure.

DETAILED DESCRIPTION

Figure 1:
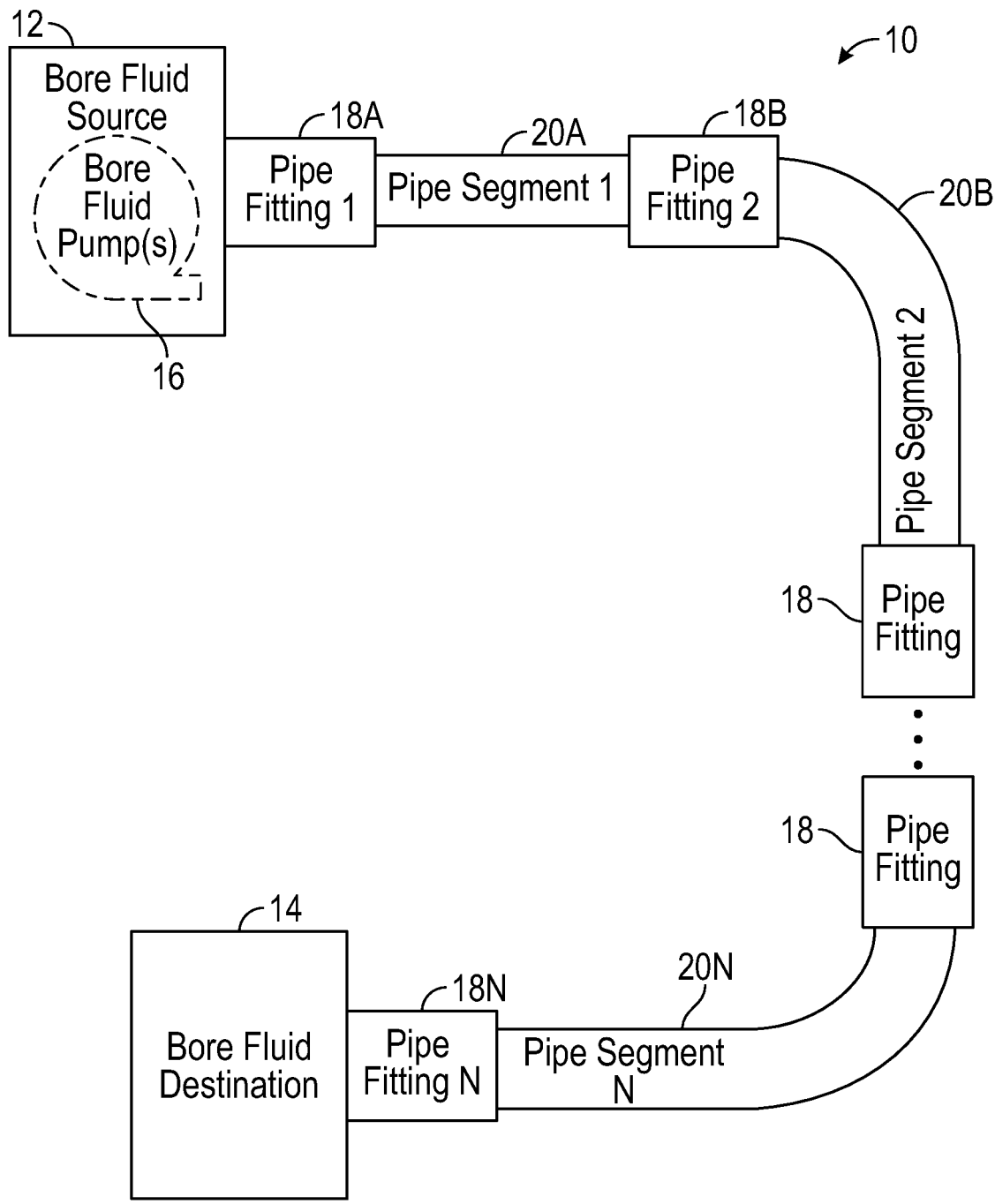
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings, such as a midline pipe fitting and/or a pipe end fitting, and one or more pipe segments. More specifically, a pipe segment may generally be secured and sealed in one or more pipe fittings to facilitate fluidly coupling the pipe segment to another pipeline component, such as another pipe segment, another pipe fitting, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, a pipe segment generally includes tubing that defines (e.g., encloses) a pipe bore, which provides a primary fluid conveyance (e.g., flow) path through the pipe segment. More specifically, the tubing of a pipe segment may be implemented to facilitate isolating environmental conditions external to the pipe segment from conditions within its pipe bore and, thus, fluid that flows therethrough. In particular, the tubing of a pipe segment may primarily be implemented to block fluid flow directly between the pipe bore of the pipe segment and its external environmental conditions, for example, in addition to providing thermal, pressure, and/or electrical isolation (e.g., insulation).

To facilitate improving fluid isolation, in some instances, the tubing of a pipe segment may be implemented with multiple tubing layers. For example, the tubing of a pipe segment may include an inner barrier (e.g., liner) layer and an outer barrier (e.g., shield and/or sheath) layer that are each implemented to run (e.g., span) the length of the pipe segment. In particular, the inner barrier layer and the outer barrier may each be implemented as a continuous layer of solid material, such as plastic, that runs the length of the pipe segment—although, at least in some instances, fluid may nevertheless gradually permeate through the inner barrier layer and/or the outer barrier layer.

In some instances, the tubing of a pipe segment may additionally include one or more intermediate layers implemented between its inner barrier layer and its outer barrier layer and, thus, in a tubing annulus of the pipe segment. In particular, to facilitate improving its tensile strength and/or its hoop strength, in some instances, the intermediate layers of pipe segment tubing may include one or more reinforcement (e.g., pressure armor and/or tensile armor) layers, which each has one or more solid (e.g., reinforcement) strips that are implemented with material that has a higher tensile strength and/or a higher linear elasticity modulus (e.g., stiffness) than material that is used to implement the inner barrier layer and/or the outer barrier layer of the pipe segment tubing. For example, a solid strip in a reinforcement layer may be implemented using metal, such as steel, while the inner barrier layer and the outer barrier layer of the pipe segment tubing are implemented using plastic, such as high-density polyethylene (HDPE).

Additionally, in some embodiments, an intermediate layer in the tubing of a pipe segment may be implemented to define free space (e.g., gaps and/or fluid conduits) within the tubing annulus of the pipe segment, for example, to facilitate improving flexibility of the pipe segment tubing. Merely as an illustrative non-limiting example, an intermediate (e.g., reinforcement) layer may be implemented in pipe segment tubing at least in part by helically wrapping a solid strip around the inner barrier layer of the pipe segment tubing such that free space is left between adjacent solid strip wraps. Another (e.g., intermediate or outer barrier) layer may then be implemented over the intermediate layer to cover the gaps, thereby defining a helically shaped gap within the annulus of the pipe segment tubing.

Nevertheless, in some instances, the tubing of a pipe segment may be damaged such that its integrity and, thus, its ability to provide isolation (e.g., insulation) between the pipe bore of the pipe segment and environmental conditions external to the pipe segment are affected (e.g., reduced). For example, a breach (e.g., hole or inadvertent opening) in the pipe segment tubing may result in excessive (e.g., undesired) fluid flow from the pipe segment directly out into environmental conditions external to the pipe segment and/or from the external environmental conditions directly into the pipe segment. In other words, at least in some instances, operating a pipeline system while pipe segment tubing deployed therein has a breach may affect (e.g., reduce) operational efficiency and/or operational reliability of the pipeline system, for example, due to the breach resulting in conveyed fluid being lost to and/or contaminated by external environmental conditions. Moreover, in some instances, a (e.g., inner) pipe segment in a pipeline system may be disposed within an outer bore, for example, of an outer pipe segment and/or which is formed in the ground. In other words, at least in such instances, it may be difficult to manually check the structural integrity of the pipe segment.

Accordingly, to facilitate improving pipeline operational efficiency and/or pipeline operational reliability, the present disclosure provides techniques for implementing and/or operating a testing apparatus in a pipeline system to facilitate detecting one or more potential breaches in the pipeline system. As will be described in more detail below, the testing apparatus may generally include multiple sensors and a test fluid source, for example, in addition to a control sub-system, which is implemented and/or operated to generally control operation of the testing apparatus. In particular, the test fluid source may be implemented to be fluidly connected to free space (e.g., gaps and/or fluid conduits) defined in the tubing annulus of a pipe segment and, thus, operated to inject test fluid, such as nitrogen ($N_2$) gas, into the tubing annulus of the pipe segment.

Additionally, as will be described in more detail below, the sensors in a testing apparatus may be implemented to be disposed along a length of a pipeline system. For example, in some embodiments, the sensors may be spaced apart along an inner surface of the tubing of an outer pipe segment within which an inner pipe segment is disposed. Furthermore, the sensors may be communicatively coupled to a control sub-system of the testing apparatus, for example, via a wired connection and/or a wireless connection.

Thus, as will be described in more detail below, in some embodiments, a control sub-system in a testing apparatus may be implemented and/or operated to determine whether a breach is potentially present in the tubing of a pipe segment, which is disposed within an outer bore, based at least in part on sensor data determined by the testing apparatus to be indicative of one or more downstream parameters that result from test fluid being injected into the tubing annulus of the pipe segment. In particular, in some embodiments, the sensors in the testing apparatus may include fluid composition sensors, which are disposed along the outer bore and implemented and/or operated to determine sensor data indicative of fluid composition present at corresponding locations in the outer bore. Additionally, as described above, the outer barrier layer of a pipe segment may generally be implemented to provide fluid isolation between fluid within the pipe segment and environmental conditions external to the pipe segment. Thus, in some embodiments, the control sub-system may determine that a breach is potentially present in the outer barrier layer of the pipe segment when the sensor data determined by the fluid composition sensors is indicative of more than a threshold amount of test fluid (e.g., set based on expected fluid permeation rate when breach is not present) being present within the outer bore.

Moreover, fluid flowing through a constricted opening generally generates noise, such as whistling and/or whooshing. Leveraging this fact, to facilitate detecting a potential breach in a pipe segment, in some embodiments, the sensors in a testing apparatus may include audio (e.g., noise) sensors, which are disposed along an outer bore in which the pipe segment is disposed and implemented and/or operated to determine sensor data indicative of noise level at corresponding locations in the outer bore. Thus, in some embodiments, the control sub-system may determine that a breach is potentially present in the outer barrier layer of the pipe segment when the sensor data determined by the audio sensors is indicative of whistling and/or whooshing sounds, for example, due to the pipeline noise level indicated by the sensor data exceeding a pipeline noise level threshold that is set based on pipeline noise level expected to occur when a breach is not present in the pipe segment.

In any case, when a breach is potentially present in a pipeline system, to facilitate ameliorating (e.g., fixing and/or repairing) the breach, a control sub-system in a testing apparatus may additionally be implemented and/or operated to determine a potential location of the breach in the pipeline system based at least in part on the sensor data determined by the testing apparatus to be indicative of one or more downstream parameters that result from test fluid being injected into the tubing annulus of the pipe segment. As described above, in some embodiments, the sensors in a testing apparatus may include fluid composition sensors, which are disposed along an outer bore in which a pipe segment is disposed and implemented and/or operated to determine sensor data indicative of fluid composition (e.g., amount of one or more fluid components) present at corresponding locations in the outer bore. Since the outer barrier layer of a pipe segment is generally implemented to provide fluid isolation between fluid within the pipe segment and environmental conditions external to the pipe segment, in such embodiments, the control sub-system may determine that the potential location of a breach in the outer barrier layer of the pipe segment is proximate to a fluid composition sensor that determined sensor data indicative of the largest amount (e.g., percentage and/or concentration) of test fluid.

As described above, in addition to providing fluid isolation, at least in some instances, the outer barrier layer of a pipe segment may provide temperature insulation between fluid within the pipe segment and environmental conditions external to the pipe segment. Thus, to facilitate detecting a potential breach in a pipe segment, in some embodiments, the sensors in a testing apparatus may include temperature sensors, which are disposed along an outer bore in which the pipe segment is disposed and implemented and/or operated to determine sensor data indicative of fluid temperature present at corresponding locations in the outer bore. In such embodiments, the control sub-system in the testing apparatus may determine that the potential location of a breach in the outer barrier layer of the pipe segment is proximate to a temperature sensor that determined sensor data indicative of the smallest difference between actual fluid temperature within the outer bore and an associated expected test fluid temperature, for example, which is set based at least in part on an injection temperature of the test fluid and the gradual rate of heat transfer expected to occur through the outer barrier layer of the pipe segment when a breach is not present therein.

Moreover, fluid flowing through a constricted opening generally generates noise, such as whistling and/or whooshing. Leveraging this fact, to facilitate detecting a potential breach in a pipe segment, in some embodiments, the sensors in a testing apparatus may include audio (e.g., noise) sensors, which are disposed along an outer bore in which the pipe segment is disposed and implemented and/or operated to determine sensor data indicative of noise level at corresponding locations in the outer bore. Accordingly, in such embodiments, the control sub-system in the testing apparatus may determine that the potential location of a breach in the outer barrier layer of the pipe segment is proximate to an audio sensor that determined sensor data indicative of the highest pipeline noise level, for example, while accounting for ambient noise.

To facilitate improving specificity with which a potential location of a breach in a pipeline system is identified, in some embodiments, one or more sensors in a testing apparatus may each be implemented and/or operated to time stamp its sensor data. Merely as an illustrative non-limiting example, audio sensors in the testing apparatus may each time stamp its sensor data to indicate when pipeline noise level at its corresponding location exceeds a pipeline noise level threshold, for example, which is set based on pipeline noise level expected to occur when a breach is not present.

Accordingly, based at least in part on an expected propagation rate of sound within the pipeline system and a time difference between when pipeline noise level at different audio sensors exceeds the pipeline noise level threshold, the control sub-system may determine a potential location of a noise source, such as a breach, in the pipeline system relative to the locations of the audio sensors.

As another illustrative non-limiting example, fluid composition sensors in the testing apparatus may each time stamp its sensor data to indicate when the amount of test fluid at its corresponding location exceeds a test fluid amount threshold, for example, which is set based on an expected fluid permeation rate when a breach is not present. Accordingly, based at least in part on an expected propagation rate of test fluid within the pipeline system and the time when the amount of test fluid at a fluid composition sensor exceeds the test fluid amount threshold, the control sub-system may determine the distance that the test fluid traveled within the pipeline system before reaching the fluid composition sensor. The control sub-system may then cross-correlate the travel distance of test fluid to different fluid composition sensors based on the locations of the different fluid composition sensors to determine a potential location of a breach, which enables the test fluid to travel to the fluid compositions sensors, relative to the locations of the fluid composition sensors.

Additionally or alternatively, to facilitate improving specificity with which a potential location of a breach is identified, in some embodiments, the control sub-system in a testing apparatus may determine the potential location of a breach in a pipe segment based at least in part on trends of one or more downstream parameters over a length of a pipeline system. For example, in some such embodiments, the control sub-system may determine a trend of pipeline noise level and/or a trend of the amount (e.g., percentage) of test fluid present in an outer bore in which a pipe segment is disposed over the length of the outer bore based at least in part on sensor data determined by sensors disposed along the length of the outer bore. In such embodiments, the control sub-system may then determine that the location of a breach in the pipe segment is potentially at a local maximum in the test fluid amount trend and/or the pipeline noise level trend, for example, without being limited to locations at which sensors are disposed. Additionally or alternatively, in some such embodiments, the control sub-system may determine a difference trend between the actual fluid temperature present in an outer bore in which a pipe segment is disposed and associated expected test fluid temperature over the length of the outer bore based at least in part on sensor data determined by temperature sensors disposed along the length of the outer bore. In such embodiments, the control sub-system may then determine that the location of a breach in the pipe segment is potentially at a local minimum in the temperature difference trend, for example, without being limited to locations at which sensors are disposed.

Moreover, to facilitate improving specificity with which a potential location of a breach in a pipeline system is identified, in some embodiments, a testing apparatus may iteratively determine the potential location of the breach. Merely as an illustrative non-limiting example, in some such embodiments, the control sub-system in the testing apparatus may identify a section in the pipeline system at which a breach is potentially present based on a first downstream parameter set determined along the entire length of the pipeline system as a result of test fluid being injected into a tubing annulus in the pipeline system. The control sub-system may then identify a potential location of the breach in the section of the pipeline system based on a second downstream parameter set determined along the length of the section in the pipeline system, for example, in response to test fluid again being injected into the tubing annulus in the pipeline system. In this manner, as will be described in more detail below, the present disclosure provides techniques for implementing and/or operating a testing apparatus to facilitate determining a potential location of a breach in a pipeline system, which, at least in some instances, may facilitate improving operational efficiency and/or operational reliability of the pipeline system, for example, by enabling the breach to be ameliorated (e.g., repaired) before the pipeline system begins and/or resumes normal operation.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer than three (e.g., two or one) pipe segments 20 or more than three (e.g., four, five, or more) pipe segments 20. Additionally or alternatively, in other embodiments, a pipeline system 10 may include fewer than four (e.g., three or two) pipe fittings 18 or more than four (e.g., five, six, or more) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different tubing layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may additionally define free space (e.g., one or more gaps) devoid of solid material in its annulus. In fact, in some embodiments, the free space in the tubing annulus of a pipe segment 20 may run (e.g., span) the length of the pipe segment 20 and, thus, define (e.g., enclose) one or more fluid conduits in the annulus of the tubing, which are separate from the pipe bore. In other words, in such embodiments, fluid may flow through a pipe segment 20 via its pipe bore, a fluid conduit defined within its tubing annulus, or both.

Figure 2:
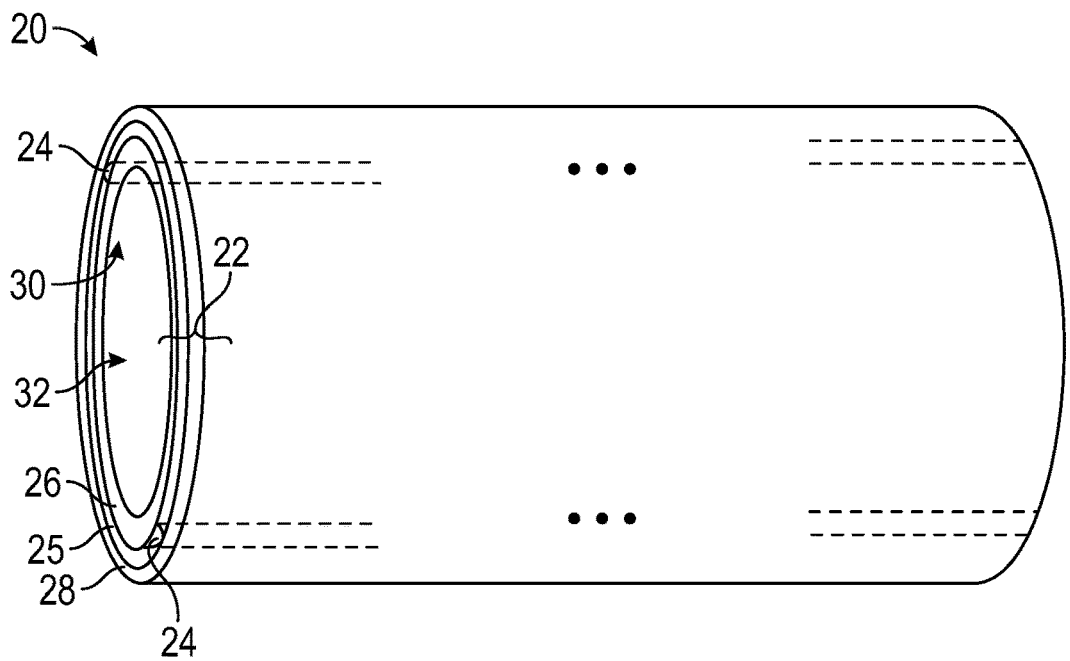
FIG. 2 is a side view of an example of a pipe segment of FIG. 1 that includes a pipe bore defined by its tubing as well as fluid conduits implemented within an annulus of its tubing, in accordance with an embodiment of the present disclosure.

To help illustrate, an example of a pipe segment 20, which includes tubing 22 with fluid conduits (e.g., free space) 24 implemented in its annulus 25, is shown in FIG. 2. As depicted, the pipe segment tubing 22 is implemented with multiple tubing layers including an inner barrier (e.g., liner) layer 26 and an outer barrier (e.g., shield and/or sheath) layer 28. In some embodiments, the inner barrier layer 26 and/or the outer barrier layer 28 of the pipe segment tubing 22 may be implemented using composite material and/or plastic, such as high-density polyethylene (HDPE) and/or raised temperature polyethylene (PE-RT). Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the inner barrier layer 26 defines (e.g., encloses) a pipe bore 32 through which fluid can flow, for example, to facilitate transporting fluid from a bore fluid source 12 to a bore fluid destination 14.

Additionally, as depicted, the tubing annulus 25 of the pipe segment 20 is implemented between its inner barrier layer 26 and its outer barrier layer 28. As will be described in more detail below, the tubing annulus 25 of a pipe segment 20 may include one or more intermediate layers. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 defined therein may include less solid material and, thus, exert less resistance to flexure, for example, compared to solid pipe segment tubing 22 and/or pipe segment tubing 22 that does not include fluid conduits 24 defined its annulus 25. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, a pipe segment 20 may include fewer than two (e.g., one) or more than two (e.g., three, four, or more) fluid conduits 24 defined in its tubing annulus 25. Additionally or alternatively, in other embodiments, a fluid conduit 24 defined in the tubing annulus 25 of a pipe segment 20 may run non-parallel to the pipe bore 32 of the pipe segment 20, for example, such that the fluid conduit 24 is skewed relative to the longitudinal extent of the pipe bore 32.

Figure 3:
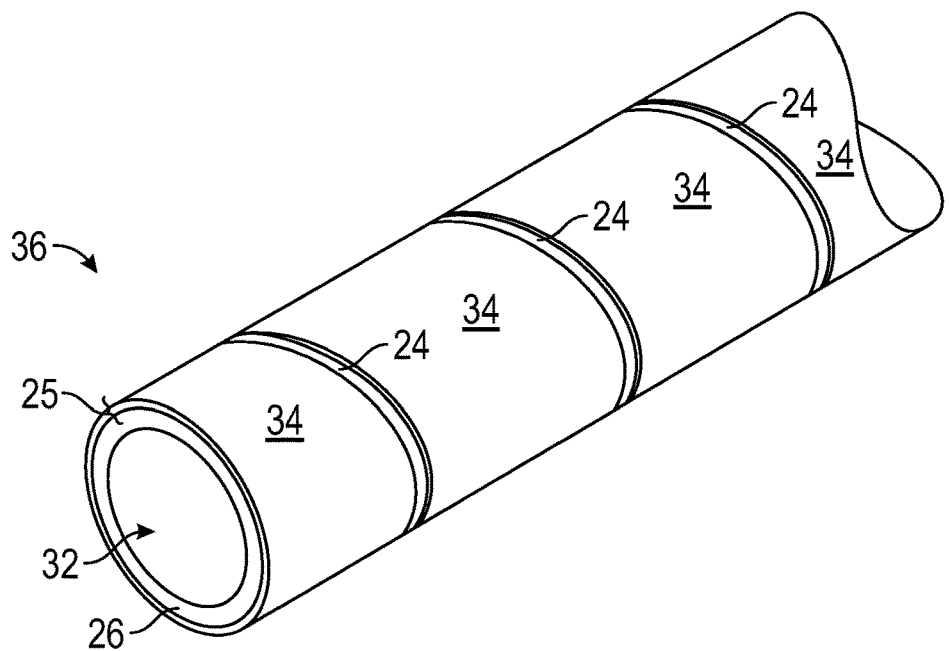
FIG. 3 is an example of a portion of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner barrier layer 26 and an intermediate layer 34 included in the annulus 25 of its pipe segment tubing 22, is shown in FIG. 3. In some embodiments, one or more intermediate layers 34 of the pipe segment tubing 22 may be implemented at least in part using composite material and/or metal, such as carbon steel, stainless steel, duplex stainless steel, super duplex stainless steel, or any combination thereof. In other words, at least in some such embodiments, the intermediate layer 34 of the pipe segment tubing 22 may be implemented using electrically conductive material, which, at least in some instances, may enable communication of electrical (e.g., control and/or sensor) signals via the intermediate layer 34.

In any case, as depicted, the intermediate layer 34 is helically disposed (e.g., wound and/or wrapped) on the inner barrier layer 26 such that free space is left between adjacent windings to define a fluid conduit 24. In other words, in some embodiments, the intermediate layer 34 may be implemented at least in part by winding a metal (e.g., steel) strip around the inner barrier layer 26 at a non-zero lay angle (e.g., fifty-four degrees) relative to the longitudinal extent of the pipe bore 32. In any case, as depicted, the resulting fluid conduit 24 runs helically along the pipe segment 20, for example, such that the fluid conduit 24 is skewed fifty-four degrees relative to the axial extent of the pipe bore 32.

In some embodiments, an outer barrier layer 28 may be disposed directly over the depicted intermediate layer 34 and, thus, cover and/or define (e.g., enclose) the depicted fluid conduit 24. However, in other embodiments, the tubing annulus 25 of pipe segment tubing 22 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer barrier layer 28 may be disposed over the third other intermediate layer 34 and, thus, cover (e.g., define and/or enclose) the other fluid conduit 24 in the third other intermediate layer 34.

In any case, in some embodiments, a pipe segment 20 in a pipeline system 10 may be disposed within an outer bore. In particular, in some such embodiments, the pipe segment 20 may be disposed within a bore that is formed in the ground. Additionally or alternatively, the pipe segment 20 may be disposed within a pipe bore 32 of another (e.g., outer) pipe segment 20.

Figure 4:
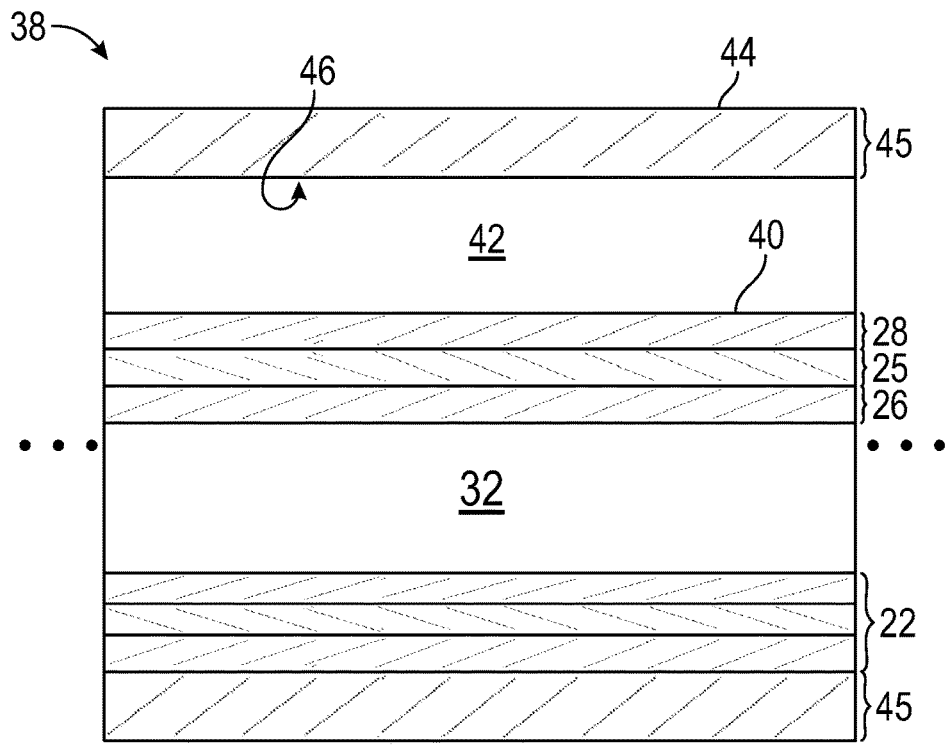
FIG. 4 is a cross-sectional view of a portion of a pipeline system that includes an inner pipe segment disposed within an outer (e.g., carrier) pipe segment, in accordance with an embodiment of the present disclosure.

To help illustrate, an example of a portion 38 of a pipeline system 10 is shown in FIG. 4. As depicted, the portion 38 of the pipeline system 10 includes a pipe segment 20—namely an inner pipe segment 40, which includes tubing 22 that defines a pipe bore 32—disposed within an outer bore 42. In particular, as in the depicted example, in some embodiments, the outer bore 42 may be a pipe bore of an outer (e.g., carrier) pipe segment 44.

However, it should be appreciated that the depicted example is merely intended to be illustrative and not limiting. In particular, similar to the inner pipe segment 40, in other embodiments, tubing 45 of the outer pipe segment 44 may also include an inner barrier layer 26, an outer barrier layer 28, and free space (e.g., one or more fluid conduits 24) defined within its annulus 25, for example, instead of being solid. Additionally, as mentioned above, in other embodiments, a (e.g., inner) pipe segment 20 may be disposed within an outer bore 42 that is formed in the ground. In other words, although the present disclosure describes techniques with regard to an inner pipe segment 40 disposed within an outer (e.g., carrier) pipe segment 44, the techniques described in the present disclosure may additionally or alternatively be applied to embodiments in which a pipe segment 20 is disposed within an outer bore 42 formed in the ground.

In any case, an inner pipe segment 40 is often disposed within an outer bore 42 at least in part by pulling the inner pipe segment 40 through the outer bore 42. However, at least in some instances, the tubing 22 of the inner pipe segment 40 may rub (e.g., scrape) against a bore surface 46 (e.g., inner surface of outer pipe segment 44) that defines the outer bore 42. In fact, in some instances, the rubbing between the tubing 22 of the inner pipe segment 40 and the bore surface 46 may cause one or more breaches (e.g., holes and/or faults) to form in the pipe segment tubing 22.

As described above, the tubing 22 of a pipe segment 20 may generally be implemented to provide fluid isolation between fluid within the pipe segment 20 and environmental conditions external to the pipe segment 20. As such, a breach in the tubing 22 of a pipe segment 20 may generally reduce its ability to provide fluid isolation. In other words, at least in some instances, operating a pipeline system 10 while pipe segment tubing 22 deployed therein has a breach may affect (e.g., reduce) operational efficiency and/or operational reliability of the pipeline system 10, for example, due to the breach resulting in conveyed fluid being lost to and/or contaminated by external environmental conditions. Accordingly, to facilitate improving pipeline operational efficiency and/or pipeline operational reliability, the present disclosure provides techniques for implementing and/or operating a testing apparatus in a pipeline system 10 to facilitate ameliorating one or more breaches in pipe segment tubing 22 deployed in a pipeline system 10, for example, before the pipeline system 10 begins and/or resumes normal operation.

Figure 5:
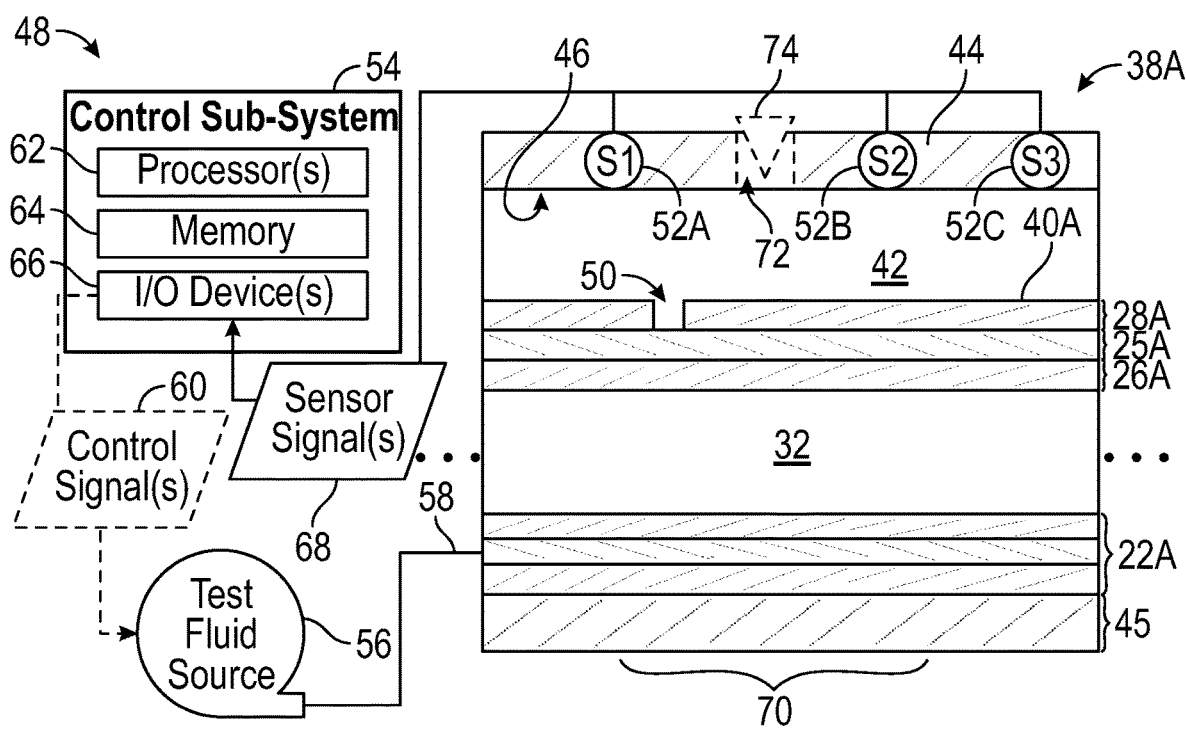
FIG. 5 depicts a damaged portion of the pipeline system of FIG. 4 and an example of a testing apparatus, in accordance with an embodiment of the present disclosure.

To help illustrate, an example of a damaged portion 38A of a pipeline system 10 and an example of a testing apparatus 48 are shown in FIG. 5. Similar to FIG. 4, the damaged portion 38A of the pipeline system 10 includes a pipe segment 20—namely an inner pipe segment 40A—disposed within an outer bore 42 of an outer pipe segment 44. However, as depicted in FIG. 5, a breach (e.g., hole or inadvertent opening) 50 is present in the outer barrier layer 28A of the inner pipe segment 40A, thereby enabling fluid flow from at least the tubing annulus 25 and potentially the pipe bore 32 of the inner pipe segment 40A directly out into the outer bore 42 and/or from the outer bore 42 directly into at least the tubing annulus 25 and potentially the pipe bore 32 of the inner pipe segment 40A.

Nevertheless, it should be appreciated that the depicted example is merely intended to be illustrative and not limiting. In particular, in other embodiments, an inner pipe segment 40 may include multiple breaches 50. Additionally or alternatively, an inner pipe segment 40 may include one or more breaches 50 in its inner barrier layer 26.

In any case, to facilitate detecting the presence of a breach 50 in a pipeline system 10, as in the depicted example, a testing apparatus 48 may generally include multiple sensors 52 and a test fluid source 56, for example, in addition to a control sub-system 54, which is implemented and/or operated to generally control operation of the testing apparatus 48. In particular, the test fluid source 56 may include a test fluid pump and/or a compressed air tank, which is implemented to be fluidly connected to free space (e.g., one or more fluid conduits 24) defined within the tubing annulus 25A of the inner pipe segment 40A via one or more external fluid conduits 58, such as a hose. As such, the test fluid source 56 may operate to inject test fluid into the free space defined within the tubing annulus 25A of the inner pipe segment 40A, for example, based at least in part on a control (e.g., command) signal 60 received from the control sub-system 54 and/or valve position of one or more fluid valves coupled between the test fluid source 56 and the tubing annulus 25A of the inner pipe segment 40A.

To facilitate reducing the likelihood of the test fluid itself reducing the integrity of the tubing 22A of the inner pipe segment 40A, in some embodiments, the test fluid injected into the tubing annulus 25A of the inner pipe segment 40A may be an inert gas. For example, the test fluid may be nitrogen ($N_2$), helium, or the like. As another example, in other embodiments, the test fluid may be methane. Additionally or alternatively, to facilitate detecting the presence of the test fluid, the test fluid may include a radioactive tracer fluid.

However, it should again be appreciated that the depicted example is merely intended to be illustrative and not limiting. In particular, in some embodiments, a testing apparatus 48 may additionally include a test head assembly, which is implemented to seal an open end of free space defined within the tubing annulus 25 of an inner pipe segment 40 while fluidly connecting a test fluid source 56 to the free space defined within the tubing annulus 25. In such embodiments, the testing apparatus 48 may additionally include another test head assembly or a pipe fitting 18 secured to an opposite end of the inner pipe segment 40 to seal an opposite end of the free space defined within the tubing annulus 25 of the inner pipe segment 40. Furthermore, in other embodiments, a testing apparatus 48 may not include a control sub-system 54, for example, when the testing apparatus 48 is implemented to have its operation manually controlled by a user, such an operator or a service technician. In fact, although the present disclosure with reference to a control sub-system 54 in a testing apparatus 48, the techniques performed by the control sub-system 54 may additionally or alternatively be performed manually by a user, such as operator or a service technician.

In any case, as described above, in some embodiments, a control sub-system 54 in a testing apparatus 48 may generally be implemented and/or operated to control operation of the testing apparatus 48. To facilitate controlling operation, as in the depicted example, a control sub-system 54 may generally include one or more processors 62, memory 64, and one or more input/output (I/O) devices 66. In particular, in some embodiments, the memory 64 in a control sub-system 54 may include one or more tangible, non-transitory, computer-readable media that are implemented and/or operated to store data and/or executable instructions. For example, the memory 64 may store sensor data based at least in part on one or more sensor signals 68 received from a sensor 52. As such, in some embodiments, the memory 64 may include volatile memory, such as random-access memory (RAM), and/or non-volatile memory, such as read-only memory (ROM), flash memory, a solid-state drive (SSD), a hard disk drive (HDD), or any combination thereof.

Additionally, in some embodiments, a processor 62 in a control sub-system 54 may include processing circuitry that is implemented and/or operated to process data and/or execute instructions stored in memory 64. In other words, in some such embodiments, a processor 62 in a control sub-system 54 may include one or more general purpose microprocessors, one or more application specific integrated circuits (ASICs), one or more field programmable gate arrays (FPGAs), or any combination thereof. For example, a processor 62 in a control sub-system 54 may process sensor data stored in memory 64 to determine whether a breach 50 is potentially present in the inner pipe segment 40A and/or to determine a potential location of the breach 50 in the inner pipe segment 40A.

Additionally or alternatively, a processor 62 in a control sub-system 54 may execute instructions stored in memory 64 to determine one or more control (e.g., command) signals 60 that instruct the testing apparatus 48 to perform a corresponding control action. For example, the control sub-system 54 may determine a control signal 60 that instructs the test fluid source 56 to supply (e.g., inject and/or pump) test fluid to the free space (e.g., one or more fluid conduits 24) defined within the tubing annulus 25A of the inner pipe segment 40A. As another example, the control sub-system 54 may determine a control signal 60 that instructs a sensor 52 to return one or more sensor signals 68 indicative of corresponding parameters, such as fluid temperature, fluid composition, and/or noise level, to the control sub-system 54.

To enable communication outside a control sub-system 54, in some embodiments, the I/O devices 66 of the control sub-system 54 may include one or more input/output (I/O) ports (e.g., terminals). Additionally, to facilitate communicating the results of a testing process to a user (e.g., operator), in some embodiments, the I/O devices 66 of a control sub-system 54 may include one or more user output devices, such as an electronic display, which is implemented and/or operated to display a graphical user interface (GUI) that provides a visual representation of whether a breach 50 is potentially present in a pipeline system 10 and/or a potential location of the breach 50 in the pipeline system 10. Furthermore, to enable user interaction with the testing apparatus 48, in some embodiments, the I/O devices 66 of a control sub-system 54 may include one or more user input devices, such as a hard button, a soft button, a keyboard, a mouse, and/or the like. For example, the one or more user input devices may enable an operator to input a user command that instructs the testing apparatus 48 to initiate a testing process for a pipeline system 10.

In any case, as described above, the tubing 22 of a (e.g., inner) pipe segment 20 is generally implemented to facilitate isolating (e.g., insulating) conditions internal to the pipe segment 20 from environmental conditions external to the pipe segment 20. For example, an inner barrier layer 26 of a pipe segment 20 may be implemented to facilitate isolating the conditions in the pipe bore 32 of the pipe segment 20 from the external environmental condition and, thus, from the conditions in free space defined within the tubing annulus 25 of the pipe segment 20, which is external to the inner barrier layer 26 of the pipe segment tubing 22. Additionally or alternatively, an outer barrier layer 28 of a pipe segment 20 may be implemented to facilitate isolating the external environmental conditions from conditions in the pipe bore 32 of the pipe segment 20 and, thus, from conditions in free space (e.g., one or more a fluid conduits 24) defined within the tubing annulus 25 of the pipe segment 20, which is internal to the outer barrier layer 28 of the pipe segment 20.

Nevertheless, in some instances, a breach (e.g., hole or inadvertent opening) in the tubing 22 of a pipe segment 20 may affect (e.g., compromise and/or reduce) its integrity and, thus, its ability to provide isolation. For example, a breach in the inner barrier layer 26 of a pipe segment 20 may reduce its ability to provide isolation between the conditions in the pipe bore 32 of the pipe segment 20 and the conditions in free space defined within the tubing annulus 25 of the pipe segment 20, which is external to the inner barrier layer 26 of the pipe segment 20. Additionally or alternatively, a breach in the outer barrier layer 28 of a pipe segment 20 may reduce its ability to provide isolation between environmental conditions external to the pipe segment 20 and the conditions in free space (e.g., one or more fluid conduits 24) defined within the tubing annulus 25 of the pipe segment 20, which is internal to the outer barrier layer 28 of the pipe segment 20. In other words, the breach 50 in the outer barrier layer 28A of the inner pipe segment 40A may result in fluid flowing from the inner pipe segment 40A directly out into environmental conditions external to the inner pipe segment 40A and, thus, the outer bore 42 of the outer pipe segment 44.

As mentioned above, even when a breach 50 is not present, at least in some instances, fluid may nevertheless gradually permeate through the inner barrier layer 26 and/or the outer barrier layer 28 of a pipe segment 20. However, the permeation rate when a breach 50 is not present is generally predictable, for example, based at least in part on a model, empirical testing, environmental conditions external to the pipe segment 20, fluid parameters of fluid input (e.g., supplied) to the pipe segment 20, implementation parameters, such as material and/or thickness, of the pipe segment tubing 22, or any combination thereof. As such, the amount of test fluid that should be present at one or more locations in the outer bore 42 due to injection of test fluid into the tubing annulus 25A of the inner pipe segment 40A may generally be predictable, for example, based on the permeation rate expected when a breach 50 is not present and the duration the test fluid has been present within the tubing annulus 25A.

Leveraging this fact, to facilitate detecting whether a breach is potentially present in the outer barrier layer 28A of the inner pipe segment 40A, as depicted, the sensors 52 of the testing apparatus 48 are disposed along the outer bore 42 and implemented and/or operated to determine sensor data indicative of one or more downstream parameters that result from supply of test fluid to the tubing annulus 25A of the inner pipe segment 40A. In the particular, the sensors 52 of the testing apparatus 48 include one or more fluid composition sensors 52, which are each implemented and/or operated to determine sensor data indicative of fluid composition (e.g., amount of one or more fluid components) at a corresponding location. For example, a fluid composition sensor 52 may determine sensor data indicative of the amount (e.g., percentage and/or concentration) of test fluid at its corresponding location.

In some embodiments, a fluid composition sensor 52 may be implemented and/or operated to determine sensor data indicative of fluid composition based at least in part on a signal received from its environmental conditions, for example, in response to transmission of a signal into its environmental conditions. Merely as an illustrative non-limiting example, the fluid composition sensor 52 may transmit an electromagnetic (e.g., light) signal into its environmental conditions and determine sensor data indicative of the amount of test fluid at its corresponding location based at least in part on an electromagnetic signal returned from its environmental conditions in response to the transmitted electromagnetic signal. Additionally, as described above, in some embodiments, a test fluid may include radioactive tracer fluid. Thus, in such embodiments, the fluid composition sensor 52 may additionally or alternatively determine sensor data indicative of the amount of test fluid at its corresponding location based at least in part on one or more radioactive signals received from its environmental conditions.

In any case, since the outer barrier layer 28A is generally implemented to provide fluid isolation, based at least in part on sensor data determined by a fluid composition sensor 52 in the testing apparatus 48, the control sub-system 54 may determine whether a breach 50 is potentially present in the outer barrier layer 28A of the inner pipe segment 40A. In particular, in some embodiments, a test fluid amount threshold associated with a fluid composition sensor 52 may be set based on the amount of test fluid expected to have permeated through the outer barrier layer 28A of the inner pipe segment 40A to the location of the fluid composition sensor 52 when a breach 50 is not present in the outer barrier layer 28A of the inner pipe segment 40A. Accordingly, in such embodiments, the control sub-system 54 may determine that a breach 50 is not present in the outer barrier layer 28A of the inner pipe segment 40A when sensor data determined by the fluid composition sensor 52 is indicative of the actual amount of test fluid at the fluid composition sensor 52 matching its associated test fluid amount threshold, for example, within an error threshold that facilitates accounting for measurement (e.g., sensor) error. On the other hand, in such embodiments, the control sub-system 54 may determine that a breach 50 is potentially present in the outer barrier layer 28A of the inner pipe segment 40A when sensor data determined by the fluid composition sensor 52 is indicative of the actual amount of test fluid at the fluid composition sensor 52 exceeding its associated test fluid amount threshold, for example, by more than the error threshold.

Moreover, fluid flowing through a constricted opening generally generates noise, such as whistling and/or whooshing. Leveraging this fact, to facilitate detecting whether a breach 50 is potentially present in the outer barrier layer 28A of the inner pipe segment 40A, in some embodiments, the sensors 52 disposed along the outer bore 42 may include audio (e.g., noise) sensors 52, which are implemented and/or operated to determine sensor data indicative of noise level at corresponding locations. Accordingly, in such embodiments, the control sub-system 54 may determine that a breach 50 is not present in the outer barrier layer 28A of the inner pipe segment 40A when sensor data determined by the audio sensors 52 is not indicative of whistling and/or whooshing sounds being present in the outer bore 42, for example, due to pipeline noise level indicated by the sensor data not exceeding a pipeline noise level threshold that is set based on pipeline noise level expected to occur when a breach 50 is not present in the inner pipe segment 40A. On the other hand, the control sub-system 54 may determine that a breach 50 is potentially present in the outer barrier layer 28A of the inner pipe segment 40A when sensor data determined by the audio sensors 52 is indicative of whistling and/or whooshing sounds being present in the outer bore 42, for example, due to the pipeline noise level indicated by the sensor data exceeding the pipeline noise level threshold by more than an error threshold that facilitates accounting for measurement (e.g., sensor) error.

In any case, to facilitate improving pipeline operational reliability and/or pipeline operational efficiency, when a breach 50 is potentially present, the testing apparatus 48 may additionally be implemented and/or operated to facilitate ameliorating (e.g., repairing and/or fixing) the breach 50. In particular, to facilitate ameliorating a breach 50 in a pipeline system 10, the control sub-system 54 may determine a potential location of the breach 50 based at least in part on the sensor data determined by the sensors 52 disposed along the pipeline system 10. As described above, the sensors 52 in the testing apparatus 48 include fluid composition sensors 52, which are implemented and/or operated to determine sensor data indicative of fluid composition present at corresponding locations. Since the outer barrier layer 28A of the inner pipe segment 40A is generally implemented to provide fluid isolation between fluid within the inner pipe segment 40A and environmental conditions external to the inner pipe segment 40A, the control sub-system 54 may determine that a breach 50 in the outer barrier layer 28A of the inner pipe segment 40A is potentially proximate to a fluid composition sensor 52 that determined sensor data indicative of the highest amount (e.g., percentage and/or concentration) of test fluid.

For example, due to its closer proximity to the breach 50, sensor data determined by a first sensor 52A in the testing apparatus 48 may be indicative of a larger amount of test fluid being present as compared to the sensor data determined by a second sensor 52B and a third sensor 52C in the testing apparatus 48. As such, based at least in part on the fluid composition sensor data, the control sub-system 54 may determine that the breach 50 in the outer barrier layer 28A of the inner pipe segment 40A is potentially closest in proximity to the first sensor 52A. Similarly, due to its closer proximity to the breach 50, sensor data determined by the second sensor 52B may be indicative of a larger amount of test fluid being present as compared to the sensor data determined by the third sensor 52C. As such, based at least in part on the fluid composition sensor data, the control sub-system 54 may determine that the breach 50 in the outer barrier layer 28A of the inner pipe segment 40A is potentially between the first sensor 52A and the second sensor 52B. In fact, to facilitate improving specificity with which the potential location of a breach 50 is identified, in some embodiments, the control sub-system 54 may interpolate the sensor data to determine a trend of the amount of test fluid along the outer bore 42 and determine that the breach 50 is potentially located at a (e.g., local) maximum in the interpolated trend, for example, without being limited to locations at which sensors 52 are deployed.

As described above, in addition to providing fluid isolation, at least in some instances, the outer barrier layer 28A of the inner pipe segment 40A may provide temperature insulation between fluid within the inner pipe segment 40A and environmental conditions external to the inner pipe segment 40A and, thus, the outer bore 42. As such, to facilitate detecting a potential location of a breach 50 in the outer barrier layer 28A of the inner pipe segment 40A, the sensors 52 disposed along the outer bore 42 may include temperature sensors 52, which are implemented and/or operated to determine sensor data indicative of fluid temperature present at corresponding locations in the outer bore 42. In such embodiments, the control sub-system 54 may determine that a breach 50 in the outer barrier layer 28A of the inner pipe segment 40A is potentially proximate to a temperature sensor 52 that determined sensor data indicative of the smallest difference between actual fluid temperature within the outer bore 42 and an associated expected test fluid temperature, for example, which is set based at least in part on an injection temperature of the test fluid and the gradual rate of heat transfer expected to occur through the outer barrier layer 28A of the inner pipe segment 40A when a breach 50 is not present therein.

For example, due to its closer proximity to the breach 50, sensor data determined by the first sensor 52A may be indicative of a smaller difference between actual bore fluid temperature and expected test fluid temperature as compared to sensor data determined by the second sensor 52B and the third sensor 52C. As such, based at least in part on the fluid temperature sensor data, the control sub-system 54 may determine that the breach 50 in the outer barrier layer 28A of the inner pipe segment 40A is potentially closest in proximity to the first sensor 52A. Similarly, due to its closer proximity to the breach 50, sensor data determined by the second sensor 52B may be indicative of a smaller difference between actual bore fluid temperature and expected test fluid temperature as compared to sensor data determined by the third sensor 52C. As such, based at least in part on the fluid temperature sensor data, the control sub-system 54 may determine that the breach 50 in the outer barrier layer 28A of the inner pipe segment 40A is potentially between the first sensor 52A and the second sensor 52B. In fact, to facilitate improving specificity with which the potential location of a breach 50 is identified, in some embodiments, the control sub-system 54 may interpolate the sensor data to determine a trend of the difference between actual bore fluid temperature and expected test fluid temperature along the outer bore 42 and determine that the breach 50 is potentially located at a (e.g., local) minimum in the interpolated trend, for example, without being limited to locations at which sensors 52 are deployed.

Moreover, as described above, since fluid flowing through a constricted opening generally generates noise, to facilitate detecting a potential location of a breach 50 in the outer barrier layer 28A of the inner pipe segment 40A, in some embodiments, the sensors 52 disposed along the outer bore 42 may include audio (e.g., noise) sensors 52, which are implemented and/or operated to determine sensor data indicative of noise level at corresponding locations. Accordingly, in such embodiments, the control sub-system 54 may determine that a breach 50 in the outer barrier layer 28A of the inner pipe segment 40A is potentially proximate to an audio sensor 52 that determined sensor data indicative of the highest pipeline noise level, for example, while accounting for ambient noise.

Merely as an illustrative non-limiting example, due to its closer proximity to the breach 50, sensor data determined by the first sensor 52A may be indicative of more noise as compared to sensor data determined by the second sensor 52B and the third sensor 52C. As such, based at least in part on the audio sensor data, the control sub-system 54 may determine that the breach 50 in the outer barrier layer 28A of the inner pipe segment 40A is potentially closest in proximity to the first sensor 52A. Similarly, due to its closer proximity to the breach 50, sensor data determined by the second sensor 52B may be indicative of more noise as compared to sensor data determined by the third sensor 52C. As such, based at least in part on the audio sensor data, the control sub-system 54 may determine that the breach 50 in the outer barrier layer 28A of the inner pipe segment 40A is potentially between the first sensor 52A and the second sensor 52B. In fact, to facilitate improving specificity with which the potential location of a breach 50 can be identified, in some embodiments, the control sub-system 54 may interpolate the sensor data to determine a trend of pipeline noise level along the outer bore 42 and determine that the breach 50 is potentially located at a (e.g., local) maximum in the interpolated trend, for example, without being limited to locations at which sensors 52 are deployed.

Additionally or alternatively, to facilitate improving specificity with which the potential location of a breach 50 is identified, in some embodiments, the sensors 52 in a testing apparatus 48 may be implemented an/or operated to time stamp their sensor data. In fact, in some embodiments, time stamping the sensor data determined by sensors 52 in a testing apparatus 48 may enable the sensor data to be processed and, thus, a potential location of a breach 50 to be determined offline, for example, by a control sub-system 54 of the testing apparatus 48 and/or manually by a user, such as an operator or a service technician.

In any case, merely as an illustrative non-limiting example, in some embodiments, audio sensors 52 in a testing apparatus 48 may each time stamp its sensor data to indicate when pipeline noise level at its corresponding location exceeds a pipeline noise level threshold, for example, which is set based on pipeline noise level expected to occur when a breach 50 is not present in in the inner pipe segment 40A. Accordingly, based at least in part on an expected propagation rate of sound within the pipeline system 10 and a time difference between when pipeline noise level at different audio sensors 52 exceeds the pipeline noise level threshold, the control sub-system 54 may determine a potential location of noise source, such as a breach, in the inner pipe segment 40A relative to the locations of the audio sensors 52.

As another illustrative non-limiting example, in some embodiments, fluid composition sensors 52 in a testing apparatus 48 may each time stamp its sensor data to indicate when the amount of test fluid at its corresponding location exceeds a test fluid amount threshold, for example, which is set based on an expected fluid permeation rate when a breach 50 is not present in the inner pipe segment 40A. Accordingly, based at least in part on an expected propagation rate of test fluid within the pipeline system 10 and the time when the amount of test fluid at a fluid composition sensor 52 exceeds the test fluid amount threshold, in some embodiments, the control sub-system 54 may determine the distance that the test fluid traveled within the pipeline system 10 before reaching the fluid composition sensor 52. In such embodiments, the control sub-system 54 may then cross-correlate the test fluid travel distance associated with different fluid composition sensors 52 based on the locations of the fluid composition sensors 52 to determine a potential location of a breach 50, which enables the test fluid to travel to the fluid compositions sensors 52, relative to the locations of the fluid composition sensors 52.

To facilitate further improving the specificity with which the potential location of a breach 50 is identified, in some embodiments, the potential location of the breach 50 may be iteratively determined. For example, based on the sensor data determined by the sensors 52, the control sub-system 54 may determine that a breach 50 is potentially present in a section 70 of the pipeline system 10 between the first sensor 52A and the second sensor 52B. The control sub-system 54 may then determine the potential location of the breach 50 within the pipeline section 70 base on sensor data determined along the pipeline section 70.

In fact, as in the depicted example, to facilitate determining sensor data along different sections 70 of a pipeline system 10, in some embodiments, one or more sensors 52 in a testing apparatus 48 may be implemented to be selectively deployed at different locations along a pipeline system 10. To facilitate selectively deploying a sensor 52 at a specific location along a pipeline system 10, in some embodiments, a sensor opening (e.g., hole) 72 may be formed such that it opens through a bore surface 46 to the outer bore 42 at the specific location. In the depicted example, a sensor opening 72 is formed through the tubing 45 of the outer pipe segment 44 between the location of the first sensor 52A and the location of the second sensor 52B. Thus, to facilitate detecting a potential location of a breach 50 in the pipeline section 70 between the first sensor 52A and the second sensor 52B, in some embodiments, the third sensor 53C may be moved to and secured in the sensor opening 72. Moreover, as in the depicted example, a sensor opening 72 may be sealed via a plug 74 when a sensor 52 is not secured therein, for example, to facilitate reducing the likelihood of external environmental conditions contaminating fluid in the outer bore 42 or vice versa and, thus, potentially affecting accuracy of a testing process.

However, it should again be appreciated that the depicted example is merely intended to be illustrative and not limiting. In particular, in other embodiments, a testing apparatus 48 may not include a sensor opening 72 or include multiple (e.g., two, three, or more) sensor openings 72. Additionally or alternatively, a testing apparatus 48 may include fewer than three (e.g., two) or more than three (e.g., four, five, or more) sensors 52. Moreover, although the present disclosure describes examples in which sensors 52 of a testing apparatus 48 are disposed along an outer bore 42 to facilitate detecting a breach 50 in the outer barrier layer 28 of an inner pipe segment 40, the techniques described in the present disclosure may additionally or alternatively facilitate detecting a breach 50 in the inner barrier layer 26 of the inner pipe segment 40 at least in part by disposing sensors 52 of the testing apparatus 48 along a pipe bore 32 of the inner pipe segment 40. In any case, in this manner, a testing apparatus 48 may be implemented and/or operated to facilitate detecting a potential location of a breach 50 in a pipeline system 10, which, at least in some instances, may facilitate improving operational efficiency and/or operational reliability of the pipeline system 10, for example, by enabling the breach 50 to be ameliorated (e.g., repaired and/or fixed) before the pipeline system 10 begins and/or resumes normal operation.

To help further illustrate, an example of a process 76 for implementing (e.g., deploying) a testing apparatus 48 in a pipeline system is described in FIG. 6. Generally, the process 76 includes disposing sensors along a pipeline system (process block 78) and communicatively coupling the sensors to a control sub-system (process block 80). Additionally, the process 76 generally includes fluidly connecting a testing fluid source to a tubing annulus of an inner pipe segment (process block 82).

Although specific process blocks are described in a specific order, which corresponds with an embodiment of the present disclosure, it should be appreciated that the example process 76 is merely intended to be illustrative and non-limiting. In particular, in other embodiments, a process 76 for implementing a testing apparatus 48 in a pipeline system 10 may include one or more additional process blocks and/or omit one or more of the depicted process blocks. For example, some embodiments of the process 76 may additionally include sealing an unused sensor opening (process block 84) while other embodiments of the process 76 do not. As another example, some embodiments of the process 76 may additionally include communicatively coupling the test fluid source to the control sub-system (process block 86) while other embodiments of the process 76 do not. Moreover, in other embodiments, one or more of the depicted process blocks may be performed in a different order, for example, such that the test fluid source is fluidly connected to the tubing annulus of the inner pipe segment before the sensors are disposed along the pipeline system.

In any case, as described above, a testing apparatus 48 deployed in a pipeline system 10 may generally include multiple sensors 52 that are disposed along the pipeline system 10 to determine sensor data indicative of one or more downstream parameters that result from supply of test fluid to the tubing annulus 25 of an inner pipe segment 40, which is disposed within an outer bore 42, in the pipeline system 10. As such, implementing the testing apparatus 48 in a pipeline system may generally include disposing multiple sensors 52 along the pipeline system 10 (process block 78). In particular, as described above, to facilitate detecting a breach 50 in the inner barrier layer 26 of the inner pipe segment 40, in some embodiments, multiple sensors 52 of the testing apparatus 48 may be secured along the pipe bore 32 of the inner pipe segment 40. In other words, in such embodiments, disposing sensors 52 of the testing apparatus 48 along the pipeline system 10 may include securing the sensors 52 along the pipe bore 32 of the inner pipe segment 40 (process block 88).

Additionally or alternatively, as described above, to facilitate detecting a breach 50 in the outer barrier layer 28 of the inner pipe segment 40, in some embodiments, multiple sensors 52 of the testing apparatus 48 may be secured along the outer bore 42 in which the inner pipe segment 40 is disposed. In other words, in such embodiments, disposing sensors 52 of the testing apparatus 48 along the pipeline system 10 may include securing the sensors 52 along the outer bore 42 (process block 90). In particular, as described above, in some such embodiments, the sensors 52 may be secured along an outer bore 42 that is the pipe bore of an outer pipe segment 44 and/or an outer bore 42 that is formed in the ground.

Moreover, as described above, to facilitate selectively securing a sensor 52 of a testing apparatus 48 along a (e.g., pipe or outer) bore in a pipeline system 10, in some embodiments, one or more sensor openings 72 may be formed through a bore surface 46 that defines the bore. In other words, in such embodiments, a sensor 52 may be secured along a bore in the pipeline system 10 at least in part by disposing the sensor 52 in a sensor opening 72 formed through a bore surface 46 that defines the bore (process block 92). Additionally, as described above, in some such embodiments, a sensor opening 72 in which a sensor 52 is not currently secured may be sealed at least in part by securing a plug 74 in the unused sensor opening 72, for example, to facilitate reducing the likelihood of external environmental conditions contaminating fluid in a corresponding bore or vice versa and, thus, potentially affecting accuracy of a testing process (process block 84).

In any case, in addition to sensors 52, as described above, a testing apparatus 48 deployed in a pipeline system 10 may generally include a control sub-system 54. In particular, as described above, the control sub-system 54 may be communicatively coupled to the sensors 52 to enable the control sub-system 54 to process sensor data, which is indicative of one or more downstream parameters that result from supply of test fluid to the tubing annulus 25 of an inner pipe segment 40 in the pipeline system 10, to detect a potential breach 50 in the inner pipe segment 40. As such, implementing the testing apparatus 48 may generally include communicatively coupling the control sub-system 54 to the sensors 52 disposed along the pipeline system 10, for example, via a wired connection and/or a wireless connection (process block 80).

To facilitate supplying test fluid to a tubing annulus 25 of an inner pipe segment 40 in a pipeline system 10, as described above, a testing apparatus 48 deployed in the pipeline system 10 may additionally include a test fluid source 56, which is fluidly connected to free space (e.g., one or more fluid conduits 24) defined in the tubing annulus 25 of the inner pipe segment 40. As such, implementing the testing apparatus 48 may generally include fluidly connecting the test fluid source 56 to the free space defined within the tubing annulus 25 of the inner pipe segment 40 (process block 82). In particular, as described above, in some embodiments, the test fluid source 56 may be fluidly connected to the tubing annulus 25 of the inner pipe segment 40 at least in part by connecting one or more external fluid conduits 58, such as a hose, between the test fluid source 56 and the tubing annulus 25 of the inner pipe segment 40. Additionally, in some such embodiments, the test fluid source 56 may be fluid connected to the tubing annulus 25 of the inner pipe segment 40 at least in part by securing a test head assembly to the inner pipe segment 40 and fluid connecting one or more external fluid conduits 58 to a fluid port on the test head assembly.

In any case, as described above, in some embodiments, operation of a test fluid source 56 in a testing apparatus 48 may generally be controlled by a control sub-system 54 of the testing apparatus 48, for example, via one or more control (e.g., command) signals 60. In other words, in such embodiments, implementing the testing apparatus 48 may include communicatively coupling the control sub-system 54 to the test fluid source 56, for example, via a wired connection and/or a wireless connection (process block 86). However, as described above, in other embodiments, operation of a test fluid source 56 may be manually controlled, for example, at least in part by manually turning on the test fluid source 56 and/or manually adjusting valve position of a fluid valve connected between the test fluid source 56 and the tubing annulus 25 of an inner pipe segment 40 in a pipeline system 10. In any case, in this manner, a testing apparatus 48 may be implemented in a pipeline system 10 to enable the testing apparatus 48 to operate to facilitate detecting a potential breach 50 in the pipeline system 10, which, at least in some instances, may facilitate improving operational efficiency and/or operational reliability of the pipeline system 10, for example, by enabling the breach 50 to be ameliorated (e.g., repaired and/or fixed) before the pipeline system 10 begins and/or resumes normal operation.

Figure 7:
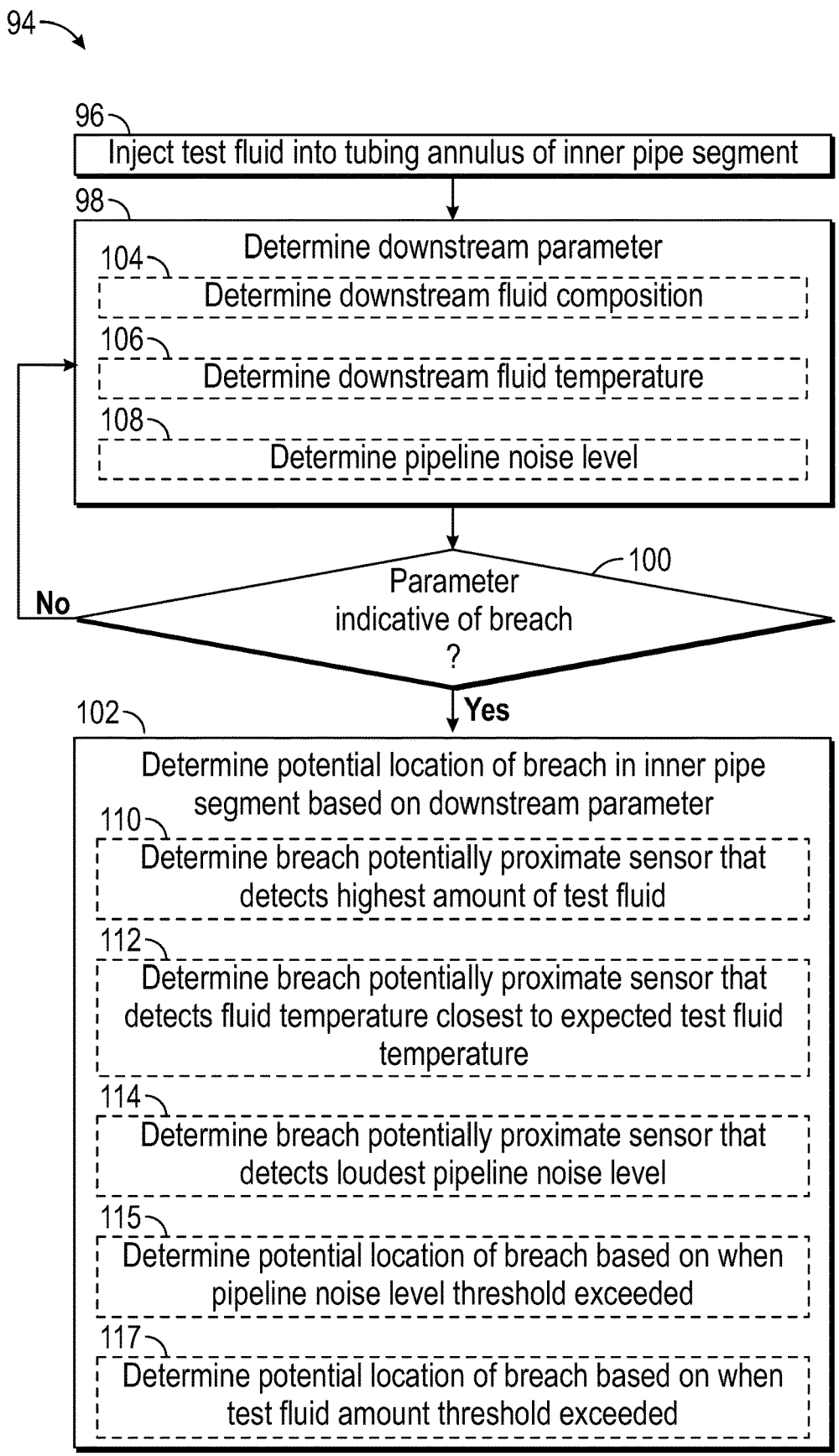
FIG. 7 is a flow diagram of an example of a process for operating a testing apparatus, in accordance with an embodiment of the present disclosure.

To help further illustrate, an example of a process 94 for operating a testing apparatus 48 deployed in a pipeline system 10 is described in FIG. 7. Generally the process 94 includes injecting test fluid into a tubing annulus of an inner pipe segment (process block 96) and determining a downstream parameter (process block 98). Additionally, the process 94 generally includes determining whether the downstream parameter is indicative of a breach (decision block 100) and determining a potential location of the breach in the inner pipe segment based on the downstream parameter (process block 102).

Although specific process blocks are described in a specific order, which corresponds with an embodiment of the present disclosure, it should be appreciated that the example process 94 is merely intended to be illustrative and non-limiting. In particular, in other embodiments, a process 94 for operating a testing apparatus 48 may include one or more additional process blocks and/or omit one or more of the depicted process blocks. Moreover, in some embodiments, the process 94 may be performed at least in part by executing instructions stored in tangible, non-transitory, computer-readable media, such as memory 64 in a control sub-system 54, using processing circuitry, such as a processor 62 in the control sub-system 54.

For example, in some such embodiments, a control sub-system 54 in a testing apparatus 48 may instruct a test fluid source 56 in the testing apparatus 48 to inject (e.g., supply) test fluid into free space (e.g., one or more fluid conduits 24) defined within the tubing annulus 25 of an inner pipe segment 40 that is disposed within an outer bore 42 in a pipeline system 10 (process block 96). However, as mentioned above, in other embodiments, operation of a test fluid source 56 in a testing apparatus 48 may be manually controlled. For example, in some such embodiments, test fluid may be supplied to the free space defined within the tubing annulus 25 of an inner pipe segment 40 at least in part by manually turning on the test fluid source 56 and/or manually adjusting valve position of a fluid valve connected between the test fluid source 56 and the tubing annulus 25 of the inner pipe segment 40.

In any case, the control sub-system 54 may then determine one or more downstream parameters that result from the test fluid being injected into the tubing annulus 25 of the inner pipe segment 40 based on sensor data determined by sensors 52 of the testing apparatus 48, which are disposed along a (e.g., pipe or outer) bore in the pipeline system 10 (process block 98). In particular, as described above, in some embodiments, the sensors 52 in a testing apparatus 48 may include fluid composition sensors 52, which are each implemented and/or operated to determine sensor data indicative of fluid composition (e.g., amount of one or more fluid components) at a corresponding location. Thus, in such embodiments, based on the sensor data determined by the fluid composition sensors 52, the control sub-system 54 may determine fluid composition at multiple different locations along the bore in the pipeline system 10 (process block 104). In particular, as described above, in some embodiments, the sensor data determined by a fluid composition sensor 52 and, thus, the fluid composition at a corresponding location may be time stamped, for example, to indicate when the amount of test fluid at the fluid composition sensor 52 exceeds a test fluid amount threshold and/or to enable the sensor data to be processed offline.

Additionally, as described above, in some embodiments, the sensors 52 in a testing apparatus 48 may include temperature sensors 52, which are each implemented and/or operated to determine sensor data indicative of fluid temperature at a corresponding location. Thus, in such embodiments, based on the sensor data determined by the temperature sensors 52, the control sub-system 54 may determine fluid temperature at multiple different locations along the bore in the pipeline system 10 (process block 106). In particular, as described above, in some embodiments, the sensor data determined by a temperature sensor 52 and, thus, the fluid temperature at a corresponding location may be time stamped, for example, to enable the sensor data to be processed offline by the control sub-system 54 and/or a user, such as an operator or a service technician.

Furthermore, as described above, in some embodiments, the sensors 52 in a testing apparatus 48 may include audio (e.g., noise) sensors 52, which are implemented and/or operated to determine sensor data indicative of noise level at a corresponding location. Thus, in such embodiments, based on the sensor data determined by the audio sensors, the control sub-system 54 may determine pipeline noise level at multiple different locations along the bore in the pipeline system 10 (process block 108). In particular, as described above, in some embodiments, the sensor data determined by an audio sensor 52 and, thus, the pipeline noise level at a corresponding location may be time stamped, for example, to indicate when pipeline noise level at the audio sensor 52 exceeds a pipeline noise level threshold and/or to enable the sensor data to be processed offline.

In any case, in some embodiments, the control sub-system 54 may then determine whether one or more downstream parameters resulting from injection of the test fluid into the tubing annulus 25 of the inner pipe segment 20 is indicative of a breach 50 potentially being present in the inner pipe segment 40 (decision block 100). As described above, the inner barrier layer 26 and the outer barrier layer 28 of a (e.g., inner) pipe segment 20 may generally be implemented to provide fluid isolation—although, at least in some instances, fluid may gradually permeate through the inner barrier layer 26 and/or the outer barrier layer 28 even when a breach 50 is not present therein. However, the permeation rate when a breach 50 is not present is generally predictable, for example, based at least in part on a model, empirical testing, environmental conditions external to the pipe segment 20, fluid parameters of fluid input (e.g., supplied) to the pipe segment 20, implementation parameters, such as material and/or thickness, of the pipe segment tubing 22, or any combination thereof. As such, the amount of test fluid that should be present at one or more locations along the bore in the pipeline system 10 due to injection of test fluid into the tubing annulus 25 of the inner pipe segment 40 when a breach 50 is not present may generally be predictable, for example, based on the permeation rate expected when a breach 50 is not present and the duration the test fluid has been present within the tubing annulus 25.

Leveraging this fact, to facilitate detecting whether a breach is potentially present in the inner pipe segment 40, in some embodiments, a test fluid amount threshold associated with a fluid composition sensor 52 may be set based on the amount of test fluid expected to have permeated through the tubing 22 of the inner pipe segment 40A to the location of the fluid composition sensor 52 when a breach 50 is not present in the tubing 22 of the inner pipe segment 40. Accordingly, in such embodiments, the control sub-system 54 may determine that a breach 50 is not present in the tubing 22 of the inner pipe segment 40 when sensor data determined by the fluid composition sensor 52 is indicative of the actual amount of test fluid at the fluid composition sensor 52 matching its associated test fluid amount threshold, for example, within an error threshold that facilitates accounting for measurement (e.g., sensor) error. On the other hand, in such embodiments, the control sub-system 54 may determine that a breach 50 is potentially present in the tubing 22 of the inner pipe segment 40A when sensor data determined by the fluid composition sensor 52 is indicative of the actual amount of test fluid at the fluid composition sensor 52 exceeding its associated test fluid amount threshold, for example, by more than the error threshold.

Moreover, as described above, fluid flowing through a constricted opening generally generates noise, such as whistling and/or whooshing. As such, in some embodiments, the control sub-system 54 may determine that a breach 50 is not present in the pipeline system 10 when sensor data determined by audio sensors 52 is not indicative of whistling and/or whooshing sounds being present in the pipeline system 10, for example, due to pipeline noise level indicated by the sensor data not exceeding a pipeline noise level threshold that is set based on pipeline noise level expected to occur when a breach 50 is not present in the pipeline system 10. On the other hand, the control sub-system 54 may determine that a breach 50 is potentially present in the pipeline system 10 when sensor data determined by audio sensors 52 is indicative of whistling and/or whooshing sounds being present in the pipeline system 10, for example, due to the pipeline noise level indicated by the sensor data exceeding the pipeline noise level threshold by more than an error threshold that facilitates accounting for measurement (e.g., sensor) error.

In any case, when a breach 50 is potentially present in the inner pipe segment 40, to facilitate improving pipeline operational reliability and/or pipeline operational efficiency, the control sub-system 54 may then determine a potential location of the breach 50 in the inner pipe segment 40 based at least in part on one or more downstream parameters that result from the injection of test fluid into the tubing annulus 25 of the inner pipe segment 40 (process block 102). As described above, the tubing 22 of the inner pipe segment 40 may generally implemented to provide fluid isolation. Thus, in some embodiments, the control sub-system 54 may determine that a breach 50 in the tubing 22 of the inner pipe segment 40 is potentially proximate to a fluid composition sensor 52 that determined sensor data indicative of the highest amount (e.g., percentage and/or concentration) of test fluid (process block 110).

As described above, in addition to providing fluid isolation, at least in some instances, the tubing 22 the inner pipe segment 40 may provide temperature insulation. Thus, in some embodiments, the control sub-system 54 may determine that a breach 50 in the tubing 22 of the inner pipe segment 40 is potentially proximate to a temperature sensor 52 that determined sensor data indicative of the smallest difference between actual fluid temperature within the outer bore 42 and an associated expected test fluid temperature, for example, which is set based at least in part on an injection temperature of the test fluid and the gradual rate of heat transfer expected to occur through the tubing 22 of the inner pipe segment 40 when a breach 50 is not present therein (process block 112). Furthermore, as described above, fluid flowing through a constricted opening generally generates noise, such as whistling and/or whooshing. Thus, in some embodiments, the control sub-system 54 may determine that a breach 50 in the tubing 22 of the inner pipe segment 40 is potentially proximate to an audio sensor 52 that detected the highest pipeline noise level, for example, while accounting for ambient noise (process block 114).

Moreover, as described above, to facilitate improving the specificity with which the potential location of a breach 50 is identified, in some embodiments, audio sensors 52 in a testing apparatus 48 may time stamp their sensor data. In particular, as described above, in some embodiments, an audio sensor 52 in the testing apparatus 48 may time stamp its sensor data to indicate when pipeline noise level at its corresponding location exceeds a pipeline noise level threshold, for example, which is set based on pipeline noise level expected to occur when a breach is not present. Accordingly, based at least in part on an expected propagation rate of sound within the pipeline system 10 and a time difference between when pipeline noise level at different audio sensors 52 exceeds the pipeline noise level threshold, in some such embodiments, a control sub-system 54 of the testing apparatus 48 may determine a potential location of a noise source, such as a breach 50, in the pipeline system 10 relative to the locations of the audio sensors 52 (process block 115).

Additionally, as described above, to facilitate improving the specificity with which the potential location of a breach 50 is identified, in some embodiments, fluid composition sensors 52 in a testing apparatus 48 may time stamp its sensor data. In particular, as described above, in some embodiments, a fluid composition sensor 52 in the testing apparatus 48 may time stamp its sensor data to indicate when the amount of test fluid at its corresponding location exceeds a test fluid amount threshold, for example, which is set based on an expected fluid permeation rate within a pipeline system 10 when a breach 50 is not present in the pipeline system 10. Accordingly, based at least in part on an expected propagation rate of test fluid within the pipeline system 10 and the times when the amount of test fluid at the fluid composition sensors 52 exceed the test fluid amount threshold, in some such embodiments, a control sub-system 54 of the testing apparatus 48 may determine the distance that the test fluid traveled within the pipeline system 10 before reaching each of the fluid composition sensors 52 and, then, cross-correlate the travel test fluid distance associated with different fluid composition sensors 52 based on the locations of the fluid composition sensors 52 to determine a potential location of a breach 50, which enables the test fluid to travel to the fluid compositions sensors 52, relative to the locations of the fluid composition sensors 52 (process block 117). Additionally or alternatively, as described above, to facilitate improving the specificity with which the potential location of a breach 50 is identified, in some embodiments, the potential location of the breach 50 may be determined based at least in part on trends of one or more downstream parameters over a length of the pipeline system 10.

Figure 8:
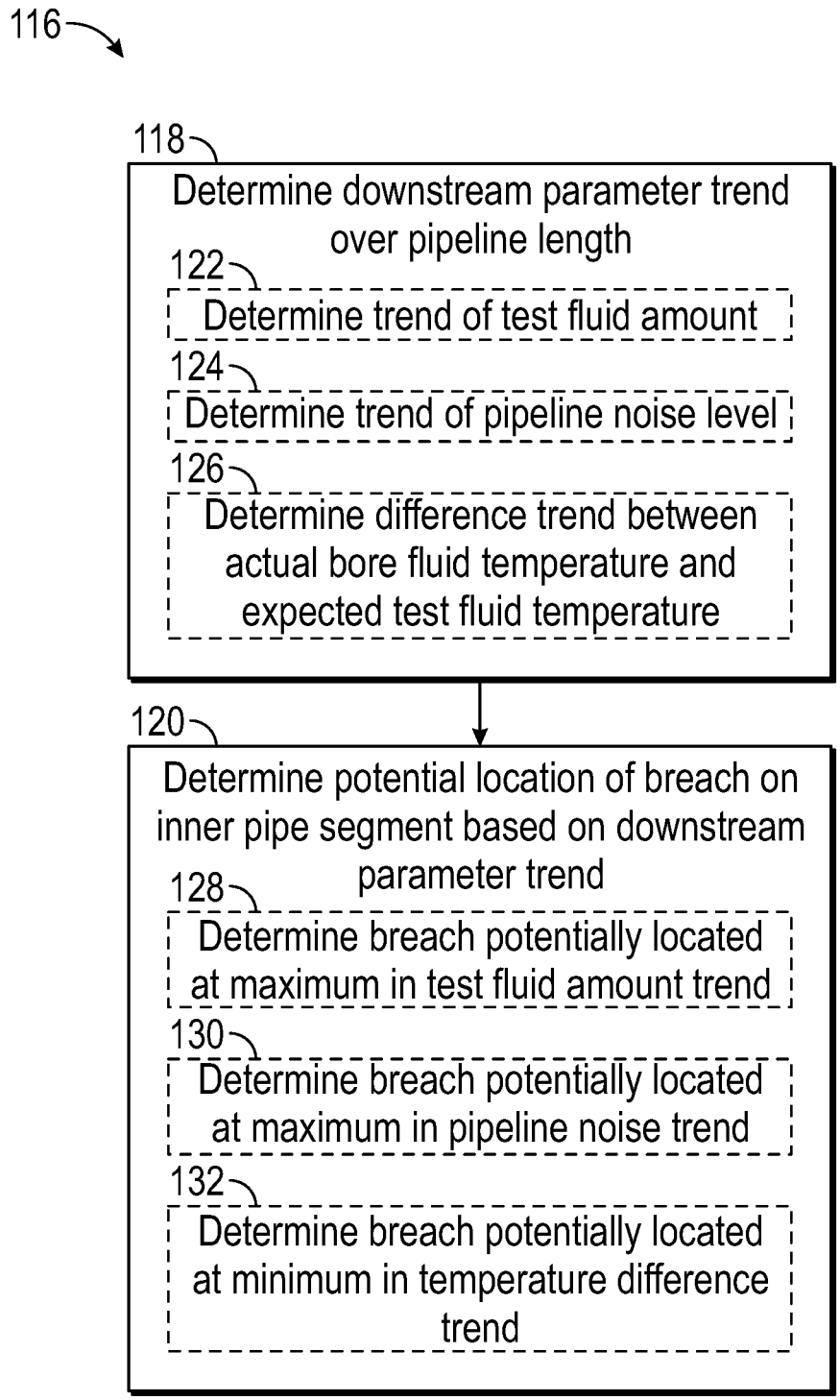
FIG. 8 is a flow diagram of an example of a process for determining a potential location of a breach in a pipeline system, in accordance with an embodiment of the present disclosure.

To help illustrate, a more detailed example of a process 116 for determining a potential location of a breach 50 in an inner pipe segment 40 in a pipeline system 10 is described in FIG. 8. Generally, the process 116 includes determining a downstream parameter trend over a pipeline length (process block 118). Additionally, the process 116 generally includes determining a potential location of a breach in an inner pipe segment based on the downstream parameter trend (process block 120).

Although specific process blocks are described in a specific order, which corresponds with an embodiment of the present disclosure, it should be appreciated that the example process 116 is merely intended to be illustrative and non-limiting. In particular, in other embodiments, a process 116 for determining a potential location of a breach 50 in an inner pipe segment 40 in a pipeline system 10 may include one or more additional process blocks and/or omit one or more of the depicted process blocks. Moreover, in some embodiments, the process 116 may be performed at least in part by executing instructions stored in tangible, non-transitory, computer-readable media, such as memory 64 in a control sub-system 54, using processing circuitry, such as a processor 62 in the control sub-system 54.

For example, to facilitate determining a potential location of a breach 50 in an inner pipe segment 40 in a pipeline system 10, a control sub-system 54 of a testing apparatus 48 deployed in the pipeline system 10 may determine a downstream parameter trend over a pipeline length based at least in part sensor data determined by sensors 52, which are disposed along a (e.g., pipe or outer) bore in the pipeline system 10 over at least the pipeline length, in response to injection of test fluid into the tubing annulus 25 of the inner pipe segment 40 (process block 118). In particular, in some embodiments, the control sub-system 54 may determine a downstream parameter trend over the entire length of the pipeline system 10. Additionally or alternatively, the control sub-system 54 may determine a downstream parameter trend over the length of a pipeline section 70 in the pipeline system 10. In fact, as will be described in more detail below, to facilitate improving the specificity with which the potential location of a breach 50 is identified, in some embodiments, the potential location of a breach 50 in a pipeline system 10 may be iteratively determined, for example, such that downstream parameters over the length of the pipeline system 10 are used to determine a pipeline section 70 in which the breach 50 is potentially located, downstream parameters over the length of the pipeline section 70 are used to determine a pipeline sub-section in which the breach 50 is potentially located, and so on.

As described above, the sensors 52 disposed along a (e.g., pipe or outer) bore in a pipeline system 10 may include fluid composition sensors 52, which are each implemented and/or operated to determine sensor data indicative of fluid composition (e.g., amount of one or more fluid components) at a corresponding location. In particular, as described above, in some embodiments, the fluid composition sensors 52 may each determine sensor data indicative of the amount (e.g., percentage and/or concentration) of test fluid at a corresponding location. Thus, in such embodiments, determining a downstream parameter trend may include determining a trend of test fluid amount over the pipeline length, for example, at least in part by interpolating and/or extrapolating the sensor data over the pipeline length (process block 122). Additionally, as described above, in some embodiments, the sensors 52 disposed along a bore in a pipeline system 10 may include audio sensors 52, which are each implemented and/or operated to determine sensor data indicative of noise level at a corresponding location. Thus, in such embodiments, determining a downstream parameter trend may include determining a trend of pipeline noise level over the pipeline length, for example, at least in part by interpolating and/or extrapolating the sensor data over the pipeline length (process block 124).

Furthermore, as described above, in some embodiments, the sensors 52 disposed along a (e.g., pipe or outer) bore in a pipeline system 10 may include temperature sensors 52, which are each implemented and/or operated to determine sensor data indicative of fluid temperature at a corresponding location. Moreover, as described above, in some embodiments, an expected test fluid temperature may be associated with each temperature sensor 52, for example, based at least in part on an injection temperature of the test fluid and the gradual rate of heat transfer expected to occur through the tubing 22 of the inner pipe segment 40 when a breach 50 is not present therein. Thus, in such embodiments, determining a downstream parameter trend may include determining a difference trend between actual bore fluid temperature and expected test fluid temperature over the pipeline length, for example, at least in part by interpolating and/or extrapolating the temperature difference at the locations of the temperature sensors 52 over the pipeline length (process block 126).

In any case, the control sub-system 54 may then determine a potential location of a breach 50 in the inner pipe segment 40 based at least in part on the one or more downstream parameter trends (process block 120). For example, since the tubing 22 of the inner pipe segment 40 is generally implemented to provide fluid isolation, the control sub-system 54 may determine that a breach 50 is potentially located at a (e.g., local) maximum in a test fluid amount trend (process block 128). Additionally, since fluid flow through a constricted opening generally generates noise, in some embodiments, the control sub-system 54 may determine that a breach 50 is potentially located at a (e.g., local) maximum in a pipeline noise level trend (process block 130). Furthermore, since the tubing 22 of the inner pipe segment 40 may provide temperature insulation, the control sub-system 54 may determine that a breach 50 is potentially located at a (e.g., local) minimum in a difference trend between actual bore fluid temperature and expected test fluid temperature (process block 132).

In this manner, a testing apparatus 48 may be operated to identify a potential location of a breach 50 in a pipeline system 10 without being limited to the locations at which sensors 52 of the testing apparatus 48 are disposed in the pipeline system 10. In fact, to facilitate improving the accuracy with which the potential location of a breach 50 is identified, in some embodiments, the control sub-system 54 may determine the potential location of the breach 50 at least in part by cross-correlating any combination of a first potential location identified based on a test fluid amount trend, a second potential location identified based on a pipeline noise level trend, and a third potential location identified based on a temperature difference trend. Moreover, as mentioned above, to facilitate improving the specificity with which a potential location of a breach 50 is identified, in some embodiments, the potential location of the breach 50 may be iteratively determined.

Figure 9:
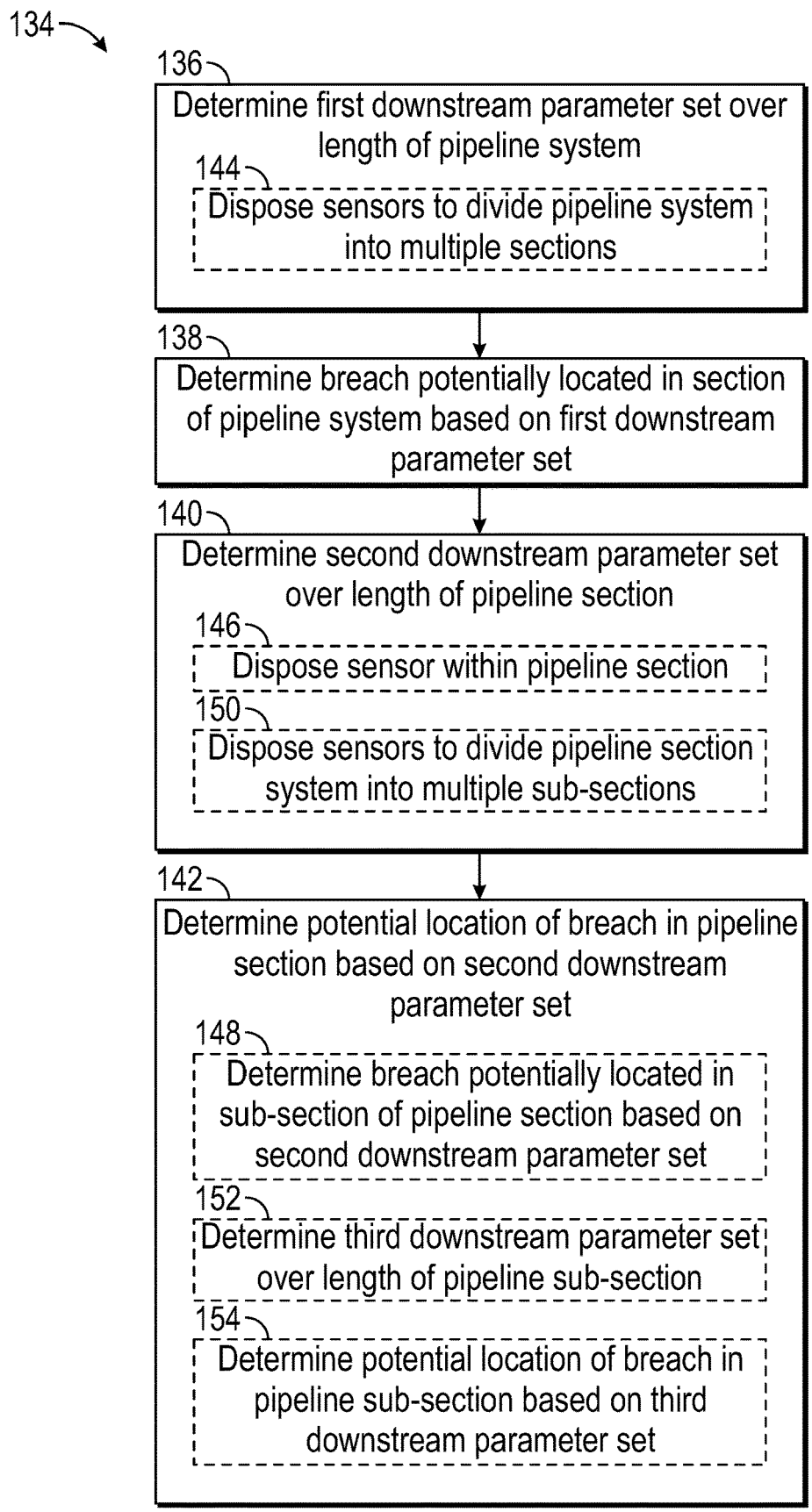
FIG. 9 is a flow diagram of an example of a process for iteratively determining a potential location of a breach in a pipeline system, in accordance with an embodiment of the present disclosure.

To help illustrate, an example of a process 134 for iteratively determining a potential location of a breach 50 in an inner pipe segment 40 in a pipeline system 10 is described in FIG. 9. Generally, the process 134 includes determining a first downstream parameter set over a length of a pipeline system (process block 136) and determining that a breach is potentially located in a section of the pipeline based on the first downstream parameter set (process block 138). Additionally, the process 134 generally includes determining a second downstream parameter set over a length of the pipeline section (process block 140) and determining a potential location of the breach in the pipeline section based on the second downstream parameter set (process block 142).

Although specific process blocks are described in a specific order, which corresponds with an embodiment of the present disclosure, it should be appreciated that the example process 134 is merely intended to be illustrative and non-limiting. In particular, in other embodiments, a process 134 for iteratively determining a potential location of a breach 50 in an inner pipe segment 40 in a pipeline system 10 may include one or more additional process blocks and/or omit one or more of the depicted process blocks. Moreover, in some embodiments, the process 134 may be performed at least in part by executing instructions stored in tangible, non-transitory, computer-readable media, such as memory 64 in a control sub-system 54, using processing circuitry, such as a processor 62 in the control sub-system 54.

For example, to facilitate determining a potential location of a breach 50 in an inner pipe segment 40 in a pipeline system 10, a control sub-system 54 of a testing apparatus 48 deployed in the pipeline system 10 may determine one or more first downstream parameter sets over the length of the pipeline system 10 based on sensor data determined by the testing apparatus 48 in response to injection of test fluid into the tubing annulus 25 of the inner pipe segment 40, for example, a first (e.g., initial) time (process block 136). As such, to facilitate determining a first downstream parameter set, the sensors 52 may be disposed along the length of the pipeline system 10. In particular, to facilitate iteratively determining the potential location of a breach 50, in some embodiments, the sensors 52 may be disposed in the pipeline system 10 to divide (e.g., separate) the pipeline system 10 into multiple pipeline sections 70, for example, which each include a sensor 52 disposed at each of its ends (process block 144). Thus, based on the one or more first downstream parameter sets determined over the length of the pipeline system 10, the control sub-system 54 may identify a pipeline section 70 in which a breach 50 is potentially located, for example, in accordance with process block 102 of FIG. 7 and/or process 116 of FIG. 8 (process block 138).

Returning to the process 134 of FIG. 9, to facilitate determining a potential location of a breach 50 in the pipeline section 70, the control sub-system 54 may then determine one or more second downstream parameter sets over the length of the pipeline section 70 based at least in part on sensor data determined by the testing apparatus 48 in response to injection of test fluid into the tubing annulus 25 of the inner pipe segment 40, for example, a second time after the first time the test fluid was injected (process block 140). As such, to facilitate determining a second downstream parameter set, one or more sensors 52 may be disposed along the length of the pipeline section 70 (process block 146). In particular, as described above, in some embodiments, a sensor 52 may be disposed along the length of a pipeline section 70 by moving the sensor 52 from a sensor opening 72 outside the pipeline section 70 to another sensor opening 72 within the pipeline section 70. In any case, based on the one or more second downstream parameter sets determined over the length of the pipeline section 70, the control sub-system 54 may identify a potential location of a breach 50 in the pipeline section 70, for example, in accordance with process block 102 of FIG. 7 and/or process 116 of FIG. 8 (process block 142).

To facilitate improving the specificity with which the potential location of a breach 50 is identified, in some embodiments, the control sub-system 54 may continue iteratively determining the potential location of the breach 50 within the pipeline section 70. In other words, in such embodiments, determining the potential location of a breach 50 in the pipeline section 70 may include identifying a pipeline sub-section within the pipeline section 70 in which the breach 50 is potentially located based on the second one or more downstream parameter sets determined over the length of the pipeline section 70 (process block 148). In particular, to facilitate iteratively determining the potential location of a breach 50, in some embodiments, sensors 52 may be disposed in a pipeline section 70 to divide (e.g., separate) the pipeline section 70 into multiple pipeline sub-sections, for example, which each include a sensor 52 disposed at each of its ends (process block 150).

In such embodiments, to facilitate determining a potential location of a breach 50 in the pipeline sub-section, the control sub-system 54 may then determine a third one or more downstream parameter sets over the length of the pipeline sub-section based at least in part on sensor data determined by the testing apparatus 48 in response to injection of test fluid into the tubing annulus 25 of the inner pipe segment 40, for example, a third time after the second time the test fluid was injected (process block 152). Based on the one or more third downstream parameter sets determined over the length of the pipeline sub-section, the control sub-system 54 may then identify a potential location of a breach 50 in the pipeline sub-section, for example, in accordance with process block 102 of FIG. 7 and/or process 116 of FIG. 8 (process block 154). In this manner, the present disclosure provides techniques for implementing and/or operating a testing apparatus 48 in a pipeline system 10 to facilitate determining a potential location of a breach 50 in the pipeline system 10, which, at least in some instances, may facilitate improving operational efficiency and/or operational reliability of the pipeline system 10, for example, by enabling the breach 50 to be ameliorated (e.g., repaired) before the pipeline system 10 begins and/or resumes normal operation.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A system comprising:
   an inner pipe segment disposed within an outer bore, wherein the inner pipe segment comprises tubing that defines a pipe bore through the inner pipe segment and a fluid conduit within a tubing annulus of the inner pipe segment; and
   a testing apparatus, wherein the testing apparatus comprises:
      a test fluid source fluidly connected to the fluid conduit defined within the tubing annulus of the inner pipe segment, wherein the test fluid source is configured to inject test fluid into the tubing annulus of the inner pipe segment; and
      a plurality of sensors disposed along the outer bore, wherein the plurality of sensors is configured to determine sensor data indicative of one or more downstream parameters that result due to injection of the test fluid into the tubing annulus of the inner pipe segment to enable a potential location of a breach in the tubing of the inner pipe segment to be determined based at least in part on the one or more downstream parameters that result due to injection of the test fluid into the tubing annulus of the inner pipe segment.

2. The system of claim 1, comprising an outer pipe segment, wherein the outer bore in which the inner pipe segment is disposed is another pipe bore of the outer pipe segment.

3. The system of claim 1, wherein the testing apparatus comprises a control sub-system communicatively coupled to the plurality of sensors, wherein:
   the plurality of sensors comprise a plurality of fluid composition sensors that are disposed along the outer bore and each configured to determine sensor data indicative of amount of the test fluid at a corresponding location in the outer bore; and
   the control sub-system is configured to determine that the breach in the tubing of the inner pipe segment is potentially closest in proximity to a fluid composition sensor in the plurality of fluid composition sensors that determined sensor data indicative of a largest amount of the test fluid.

4. The system of claim 3, wherein the control sub-system is configured to:
   determine a trend of the amount of the test fluid over a length within the outer bore by interpolating the sensor data determined by the plurality of fluid composition sensors; and
   determine the potential location of the breach in the tubing of the inner pipe segment based at least in part on a maximum in the trend of the amount of the test fluid.

5. The system of claim 3, wherein:
   a first fluid composition sensor in the plurality of fluid composition sensors is configured to time stamp first sensor data to indicate a first time when a first amount of the test fluid at the first fluid composition sensor exceeds a test fluid amount threshold;
   a second fluid composition sensor in the plurality of fluid composition sensors is configured to time stamp second sensor data to indicate a second time when a second amount of the test fluid at the second fluid composition sensor exceeds the test fluid amount threshold; and
   the control sub-system is configured to:
      determine a first travel distance of the test fluid to the first fluid composition sensor based at least in part on the first time that is time stamped in the first sensor data determined by the first fluid composition sensor and an expected propagation rate of the test fluid within the system;
      determine a second travel distance of the test fluid to the second fluid composition sensor based at least in part on the second time that is time stamped in the second sensor data determined by the second fluid composition sensor and the expected propagation rate of the test fluid within the system; and determine the potential location of the breach in the tubing of the inner pipe segment at least in part by cross-correlating the first travel distance of the test fluid to the first fluid composition sensor and the second travel distance of the test fluid to the second fluid composition sensor based at least in part on a first location of the first fluid composition sensor in the outer bore and a second location of the second fluid composition sensor in the outer bore.

6. The system of claim 3, wherein:

the test fluid injected into the tubing annulus of the inner pipe segment comprises radioactive tracer fluid; and each fluid composition sensor in the plurality of fluid composition sensors is configured to determine sensor data indicative of the amount of the test fluid at a corresponding location in the outer bore based at least in part on one or more radioactive signals received from environmental conditions within the outer bore.

7. The system of claim 1, wherein the testing apparatus comprises a control sub-system communicatively coupled to the plurality of sensors, wherein:

the plurality of sensors in the testing apparatus comprises a plurality of temperature sensors that are disposed along the outer bore and each configured to determine sensor data indicative of actual fluid temperature at a corresponding location in the outer bore; and the control sub-system is configured to determine that the breach in the tubing of the inner pipe segment is potentially closest in proximity to a temperature sensor in the plurality of temperature sensors that determined sensor data indicative of a smallest difference between actual fluid temperature and an expected test fluid temperature associated with the temperature sensor.

8. The system of claim 1, wherein the testing apparatus comprises a control sub-system communicatively coupled to the plurality of sensors, wherein:

the plurality of sensors comprises a plurality of audio sensors that are disposed along the outer bore and each configured to determine sensor data indicative of noise level at a corresponding location in the outer bore; and the control sub-system is configured to determine that the breach in the tubing of the inner pipe segment is potentially closest in proximity to an audio sensor in the plurality of audio sensors that determined sensor data indicative of a loudest noise level.

9. The system of claim 8, wherein the control sub-system is configured to:

determine a trend of the noise level over a length within the outer bore at least in part by interpolating the sensor data determined by the plurality of audio sensors; and determine the potential location of the breach in the tubing of the inner pipe segment based at least in part on a maximum in the trend of the noise level.

10. The system of claim 8, wherein:

a first audio sensor in the plurality of audio sensors is configured to time stamp first sensor data to indicate a first time when a first pipeline noise level at the first audio sensor exceeds a pipeline noise level threshold;

a second audio sensor in the plurality of audio sensors is configured to time stamp second sensor data to indicate a second time when a second pipeline noise level at the second audio sensor exceeds the pipeline noise level threshold; and the control sub-system is configured to determine the potential location of the breach in the tubing of the inner pipe segment based at least in part on the first time that is time stamped in the first sensor data determined by the first audio sensor, a first location of the first audio sensor in the outer bore, the second time that is time stamped in the second sensor data determined by the second audio sensor, a second location of the second audio sensor in the outer bore, and an expected propagation rate of sound within the outer bore.

11. The system of claim 1, comprising:

a first sensor opening formed through a bore surface that defines the outer bore; and a second sensor opening formed through the bore surface that defines the outer bore, wherein a sensor in the plurality of sensors in the testing apparatus is:

disposed within the first sensor opening and configured to determine first sensor data indicative of a first downstream parameter that results due to injection of the test fluid into the tubing annulus of the inner pipe segment during a first time period; and disposed within the second sensor opening and configured to determine second sensor data indicative of a second downstream parameter that results due to injection of the test fluid into the tubing annulus of the inner pipe segment during a second time period after the first time period.

12. The system of claim 11, wherein the testing apparatus comprises a plug:

disposed within the second sensor opening to seal the second sensor opening during the first time period; and disposed within the first sensor opening to seal the first sensor opening during the second time period after the first time period.

13. The system of claim 1, wherein:

the plurality of sensors is configured to:

determine first sensor data indicative of first one or more downstream parameters that result along a length of the outer bore due to injection of the test fluid into the tubing annulus of the inner pipe segment a first time; and determine second sensor data indicative of second one or more downstream parameters that result along a section of the outer bore due to injection of the test fluid into the tubing annulus of the inner pipe segment a second time after the first time; and a control sub-system is configured to:

determine that the breach in the tubing of the inner pipe segment is potentially located in the section of the outer bore based on the first one or more downstream parameters that result due to injection of the test fluid into the tubing annulus of the inner pipe segment the first time; and determine the potential location of the breach within the section of the outer bore based on the second one or more downstream parameters that result due to injection of the test fluid into the tubing annulus of the inner pipe segment the second time.

14. A method of operating a testing apparatus deployed in a pipeline system, comprising:

instructing, using a control sub-system of the testing apparatus, a test fluid source of the testing apparatus to inject test fluid into free space defined within a tubing annulus of an inner pipe segment in the pipeline system, wherein the inner pipe segment is disposed within an outer bore;

determining, using the control sub-system, one or more downstream parameters that result due to injection of the test fluid into the tubing annulus of the inner pipe segment based at least in part on sensor data determined by a plurality of sensors of the testing apparatus that is disposed along the outer bore;

determining, using the control sub-system, whether a breach is potentially present in the inner pipe segment based at least in part on the one or more downstream parameters that result due to injection of the test fluid into the tubing annulus of the inner pipe segment; and in response to determining that a breach is potentially present in the inner pipe segment, determining, using the control sub-system, a potential location of the breach based at least in part on the one or more downstream parameters that result due to injection of the test fluid into the tubing annulus of the inner pipe segment.

15. The method of claim 14, wherein:

determining the one or more downstream parameters comprises determining amount of the test fluid at a sensor in the plurality of sensors, determining a noise level at the sensor in the plurality of sensors, or both; and determining whether a breach is potentially present in the inner pipe segment comprises determining that the breach is potentially present in the inner pipe segment when the amount of the test fluid at the sensor exceeds a test fluid amount threshold, when the noise level at the sensor is indicative of whooshing, or both.

16. The method of claim 14, wherein:

determining the one or more downstream parameters comprises determining first sensor data indicative of amount of the test fluid at each of the plurality of sensors, determining second sensor data indicative of pipeline noise level at each of the plurality of sensors, or both; and determining the potential location of the breach comprises:

determining a first trend of the amount of the test fluid over a length within the pipeline system at least in part by interpolating the first sensor data, determining a second trend of the pipeline noise level of the length within the pipeline system at least in part by interpolating the second sensor data; and determining the potential location of the breach in the inner pipe segment based at least in part on a first maximum in the first trend of the amount of the test fluid, a second maximum in the second trend of the pipeline noise level, or both.

17. The method of claim 14, wherein:

determining the one or more downstream parameters comprises:

determining first sensor data that is time stamped to indicate a first time when amount of the test fluid at a first sensor in the plurality of sensors exceeds a test fluid amount threshold, when pipeline noise level at the first sensor exceeds a pipeline noise level threshold, or both; and determining second sensor data that is time stamped to indicate a second time when amount of the test fluid at a second sensor in the plurality of sensors exceeds the test fluid amount threshold, when pipeline noise level at the second sensor exceeds the pipeline noise level threshold, or both; and determining the potential location of the breach comprises determining the potential location of the breach in the inner pipe segment based at least in part on the first time that is time stamped in the first sensor data, a first location of the first sensor in the pipeline system, the second time that is time stamped in the second sensor data, and a second location of the second sensor in the pipeline system.

18. The method of claim 14, wherein:

instructing the test fluid source to inject the test fluid comprises:

instructing the test fluid source to inject the test fluid into the free space defined within the tubing annulus of the inner pipe segment a first time; and instructing the test fluid source to inject the test fluid into the free space defined within the tubing annulus of the inner pipe segment a second time after the first time;

determining the one or more downstream parameters comprises:

determining a first one or more downstream parameters that result due to injection of the test fluid into the tubing annulus of the inner pipe segment the first time based at least in part on first sensor data determined by the plurality of sensors while disposed along a length of the pipeline system; and determining a second one or more downstream parameters that result due to injection of the test fluid into the tubing annulus of the inner pipe segment the second time based at least in part on second sensor data determined by the plurality of sensors while disposed along a section in the length of the pipeline system; and determining the potential location of the breach comprises:

determining that the breach is potentially located within the section of the pipeline system based at least in part on the first one or more downstream parameters; and determining the potential location of the breach within the section of the pipeline system based at least in part on the second one or more downstream parameters.

19. A testing apparatus to be deployed in a pipeline system, comprising:

a test fluid source configured to be fluidly connected to free space defined within a tubing annulus of an inner pipe segment in the pipeline system to enable the test fluid source to inject test fluid into the tubing annulus of the inner pipe segment;

a plurality of sensors configured to be disposed along an outer bore in the pipeline system to enable the plurality of sensors to determine sensor data indicative of one or more downstream parameters that result due to the test fluid being injected into the tubing annulus of the inner pipe segment, wherein the inner pipe segment is disposed within the outer bore; and a control sub-system configured to be communicatively coupled to the plurality of sensors to enable the control sub-system to:

determine one or more downstream parameter trends that result due to the test fluid being injected into the tubing annulus of the inner pipe segment based at least in the sensor data determined by the plurality of sensors;

and determine a potential location of a breach in the inner pipe segment based at least in part on a maximum in the one or more downstream parameter trends.

20. The testing apparatus of claim 19, wherein:

the plurality of sensors comprises:

a plurality of fluid composition sensors configured to be disposed along the outer bore to enable the plurality of fluid composition sensors to determine first sensor data indicative of amount of the test fluid in the outer bore due to the test fluid being injected into the tubing annulus of the inner pipe segment;

a plurality of audio sensors configured to disposed along the outer bore to enable the plurality of audio sensors to determine second sensor data indicative of pipeline noise level in the outer bore due to the test fluid being injected into the tubing annulus of the inner pipe segment; or both; and the control sub-system is configured to:

determine a first trend of the amount of the test fluid along the outer bore at least in part by interpolating the first sensor data determined by the plurality of fluid composition sensors;

determine a second trend of the pipeline noise level along the outer bore at least in part by interpolating the second sensor data determined by the plurality of audio sensors; or both.

* * * * *